US012459265B2

(12) United States Patent
Arima et al.

(10) Patent No.: US 12,459,265 B2
(45) Date of Patent: Nov. 4, 2025

(54) INKJET RECORDING DEVICE

(71) Applicant: Hitachi Industrial Equipment Systems Co., Ltd., Tokyo (JP)

(72) Inventors: Takahiro Arima, Tokyo (JP); Yusuke Okamoto, Tokyo (JP); Sho Mizoguchi, Tokyo (JP); Akira Miyao, Tokyo (JP); Tatsuo Matsumoto, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 231 days.

(21) Appl. No.: 18/032,722

(22) PCT Filed: Nov. 4, 2020

(86) PCT No.: PCT/JP2020/041247

§ 371 (c)(1),
(2) Date: Apr. 19, 2023

(87) PCT Pub. No.: WO2022/097212

PCT Pub. Date: May 12, 2022

(65) Prior Publication Data

US 2023/0391089 A1 Dec. 7, 2023

(51) Int. Cl.
*B41J 2/17* (2006.01)
*B41J 2/185* (2006.01)

(52) U.S. Cl.
CPC ............. *B41J 2/1721* (2013.01); *B41J 2/185* (2013.01); *B41J 2/1735* (2024.05); *B41J 2/1742* (2024.05)

(58) Field of Classification Search
CPC ................................ B41J 2/1721; B41J 2/185
See application file for complete search history.

(56) References Cited

U.S. PATENT DOCUMENTS

2007/0180159 A1 8/2007 Takahashi
2019/0217627 A1 7/2019 Arima et al.
(Continued)

FOREIGN PATENT DOCUMENTS

EP 3 067 207 A1 9/2016
JP 9-39488 A 2/1997
(Continued)

OTHER PUBLICATIONS

Japanese-language Office Action issued in Japanese Application No. 2024-034375 dated Nov. 26, 2024 with English translation (6 pages).
(Continued)

*Primary Examiner* — Sharon Polk
(74) *Attorney, Agent, or Firm* — Crowell & Moring LLP

(57) ABSTRACT

An object of the present invention is to reduce the amount of solvent vapor floating around when a print head is cleaned in an inkjet recording device. In addition, an object is to reduce ink stains on a periphery of the print head. An inkjet recording device includes a main body portion and a print head. The main body portion includes an ink container that contains ink, and a solvent container that contains a solvent. The print head includes a nozzle connected to the ink container to discharge the pressurized and supplied ink, a charging electrode that charges ink particles discharged from the nozzle, a deflection electrode that deflects the ink particles charged by the charging electrode, and a gutter that collects the ink. In addition, a head mounting unit for cleaning the print head is provided. The head mounting unit is connected to a solvent vapor suction path for suctioning solvent vapor generated therearound.

10 Claims, 25 Drawing Sheets

(56) References Cited

U.S. PATENT DOCUMENTS

| | | | |
|---|---|---|---|
| 2019/0389222 A1 | 12/2019 | Bonneton et al. | |
| 2020/0101741 A1 | 4/2020 | Arima et al. | |
| 2021/0229446 A1 | 7/2021 | Yamaguchi et al. | |
| 2022/0250377 A1* | 8/2022 | Arima | B41J 2/18 |

FOREIGN PATENT DOCUMENTS

| | | | | |
|---|---|---|---|---|
| JP | 2004-209897 A | | 7/2004 | |
| JP | 2007-208528 A | | 8/2007 | |
| JP | 2014-73644 A | | 4/2014 | |
| JP | 2014168896 A | * | 9/2014 | |
| JP | 2015-136933 A | | 7/2015 | |
| JP | 2017-80893 A | | 5/2017 | |
| JP | 2019-123117 A | | 7/2019 | |
| JP | 2020-49786 A | | 4/2020 | |
| WO | WO 2017/141483 A1 | | 8/2017 | |
| WO | WO-2019234965 A1 | * | 12/2019 | B41J 2/16552 |

OTHER PUBLICATIONS

International Search Report (PCT/ISA/210) issued in PCT Application No. PCT/JP2020/041247 dated Jan. 26, 2021 with English translation (10 pages).

Japanese-language Written Opinion (PCT/ISA/237) issued in PCT Application No. PCT/JP2020/041247 dated Jan. 26, 2021 (seven (7) pages).

Extended European Search Report issued in European Application No. 20960766.2 dated Oct. 25, 2024 (13 pages).

Partial Supplementary European Search Report issued in European Application No. 20960766.2 dated Jul. 1, 2024 (13 pages).

* cited by examiner

FIG. 17A
FIG. 17B
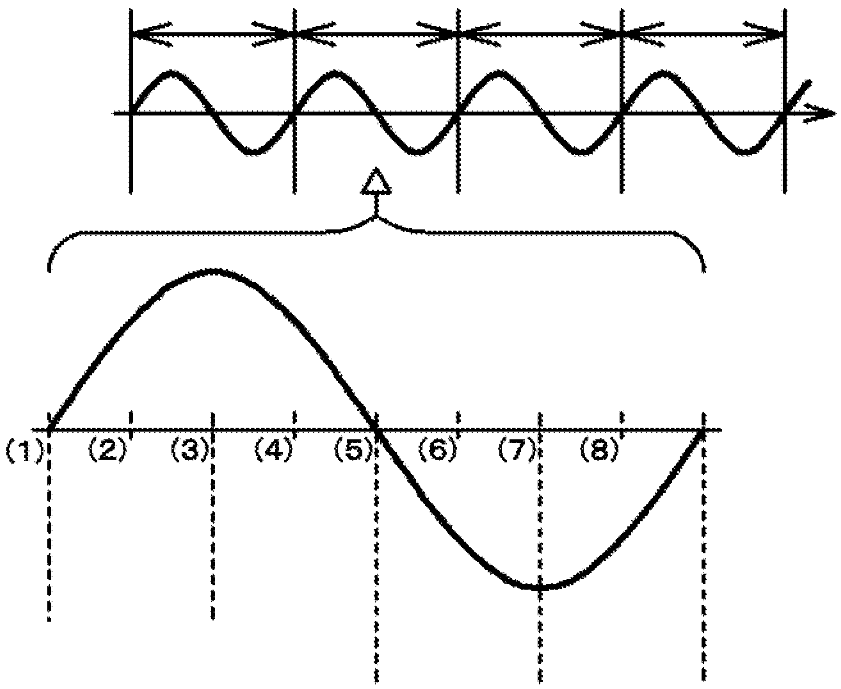
FIG. 17C
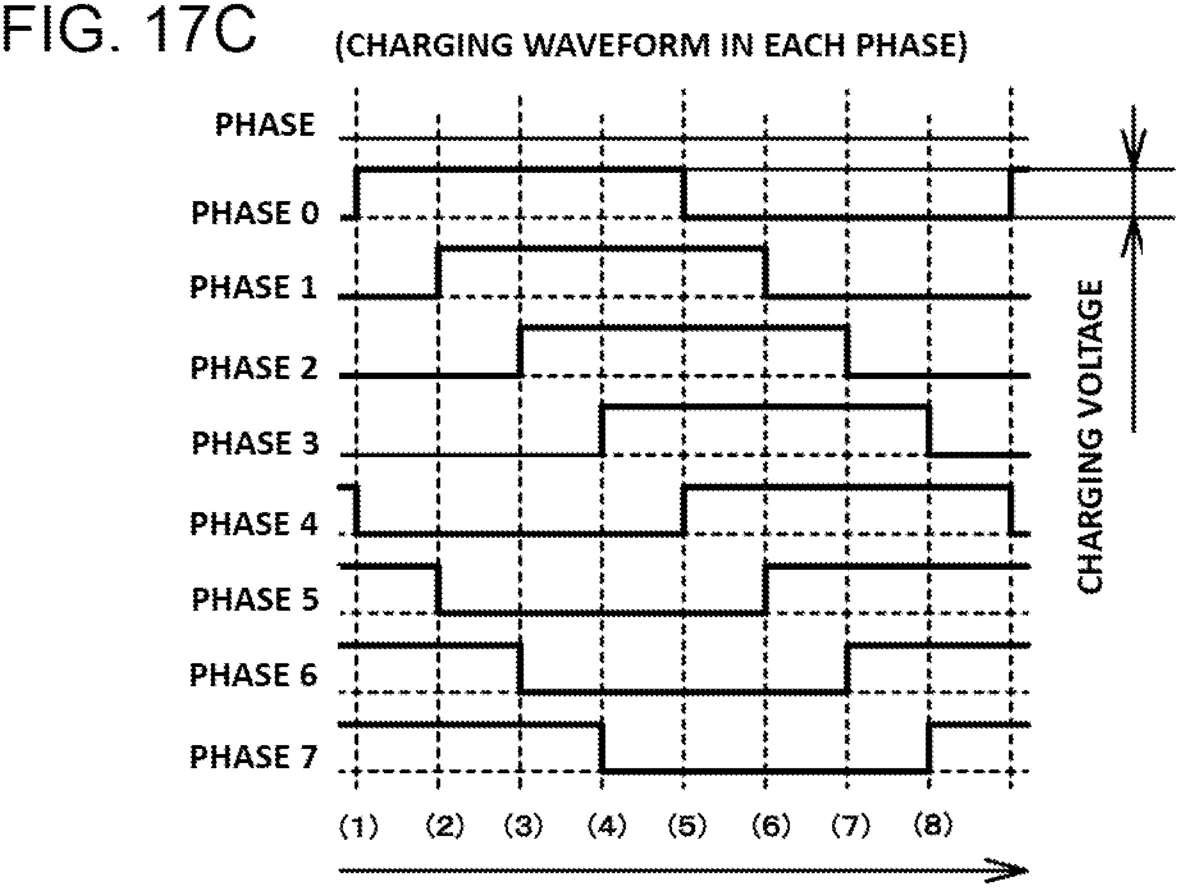

INKJET RECORDING DEVICE

TECHNICAL FIELD

The present invention relates to an inkjet recording device.

BACKGROUND ART

Patent Document 1 (JP 2020-49786 A) is known as a technique related to this technical field. Patent Document 1 discloses "an inkjet recording device including: an ink container that contains ink for performing printing on a print object; a nozzle that is connected to the ink container to discharge the pressurized and supplied ink; a charging electrode that charges ink particles discharged from the nozzle; a deflection electrode that deflects the ink particles charged by the charging electrode; a gutter that collects the ink that is not used for printing; a solvent container that contains a solvent; and a liquid nozzle that is connected to the solvent container to discharge the pressurized and supplied solvent. The liquid nozzle includes a liquid flow path portion extending from the nozzle in a gutter direction, and a liquid discharge hole portion formed at an angle at which the pressurized and supplied solvent hits the nozzle via the liquid flow path portion."

In addition, a technique of Patent Document 2 (JP 2019-123117 A) is also known. Patent Document 2 discloses "an inkjet recording device including: an ink container that contains ink for performing printing on a print object; a nozzle that is connected to the ink container to discharge the pressurized and supplied ink; a charging electrode that charges ink particles discharged from the nozzle; a charging signal generation unit that generates a charging signal for causing the charging electrode to perform charging; a deflection electrode that deflects the ink particles charged by the charging electrode; a gutter that collects the ink that is not used for printing; and a control unit that controls an overall operation. First electric charge detection means for detecting an electric charge amount caused by the charging of the ink particles between the charging electrode and the deflection electrode and second electric charge detection means for detecting an electric charge amount of the ink flowing inside the gutter are provided."

CITATION LIST

Patent Document

Patent Document 1: JP 2020-49786 A
Patent Document 2: JP 2019-123117 A

SUMMARY OF THE INVENTION

Problems to be Solved by the Invention

Patent Document 1 describes a configuration of and a method for controlling the inkjet recording device to clean ink stains on a print head by discharging the solvent from the liquid nozzle to the print head set in a head cleaning unit (head cleaning step) and thereafter, to dry the solvent that has adhered to the print head, by discharging air from an air nozzle (head drying step). Here, there is a possibility that in the head drying step, the solvent (liquid) changes into solvent vapor (gas) and the solvent vapor floats around the print head.

In addition, Patent Document 2 describes a configuration of and a method for controlling the inkjet recording device to detect an abnormality that the ink particles discharged from the nozzle of the print head cannot be captured by the gutter (generally, referred to as beam bending). There is a possibility that such an abnormality (beam bending) occurs immediately after the ejection of the ink from the nozzle is started. If an abnormality (beam bending) occurs, there is a possibility that a periphery of the print head is stained with the ink.

Therefore, an object of the present invention is to reduce the amount of solvent vapor floating around when a print head is cleaned. In addition, another object of the present invention is to reduce ink stains on a periphery of the print head caused by occurrence of an abnormality at the start of ink ejection.

Solutions to Problems

In order to achieve the above-described object, as one example of the present invention, there is provided an inkjet recording device including: a print head that performs printing; a main body including a path for supplying ink in an ink container to the print head, a path for collecting the ink that is not used for printing, in the ink, a path for supplying a solvent in a solvent container to the ink container, and a regulating unit that regulates a flow of the ink and the solvent in each of the paths; a control unit that controls the main body and the print head; and a head mounting unit including a cleaning tank having a space in which the print head is containable, and an opening portion at a lower portion of the cleaning tank, and a collection container that collects a liquid flowing out from the opening portion. A solvent vapor suction path connected to the cleaning tank to suction and discharge solvent vapor generated in the cleaning tank and a drive unit that discharges the solvent vapor are provided.

In addition, as another example of the present invention, there is provided an inkjet recording device including: a print head including a nozzle that atomizes and discharges input ink, a charging electrode that charges ink particles discharged from the nozzle, a deflection electrode that deflects the ink particles charged by the charging electrode, and a gutter that collects unused ink that is not used for printing; a main body including an ink supply path for supplying the ink in an ink container to the nozzle, an ink collection path for collecting the unused ink collected by the gutter, in the ink, a solvent supply path for supplying a solvent in a solvent container, and a regulating unit that regulates a flow of the ink and the solvent in each of the paths; a control unit that controls the main body and the print head; and a head mounting unit including a cleaning tank having a space in which the print head is containable, a cleaning nozzle that discharges the solvent toward the print head contained in the cleaning tank, and an air discharge port that discharges air for drying the print head into the cleaning tank. An electric charge sensor that detects an electric charge amount of the ink particles charged by the charging electrode is provided. The control unit causes the cleaning nozzle to discharge the solvent to clean the print head, and then detects whether or not the electric charge sensor reacts in a state where a voltage is applied to the deflection electrode.

In addition, as another example of the present invention, there is provided an inkjet recording device including: a print head including a nozzle that atomizes and discharges input ink, a charging electrode that charges ink particles discharged from the nozzle, a deflection electrode that deflects the ink particles charged by the charging electrode, and a gutter that collects unused ink that is not used for printing; a main body including an ink supply path for supplying the ink in an ink container to the nozzle, an ink collection path for collecting the unused ink collected by the gutter, in the ink container, a solvent supply path for supplying a solvent in a solvent container, and a regulating unit that regulates a flow of the ink and the solvent in each of the paths; a control unit that controls the main body and the print head; and a head mounting unit in which the print head is containable. The control unit checks a state where the print head is mounted in the head mounting unit, and then causes the nozzle to start discharging the ink particles.

Effects of the Invention

According to the present invention, when the print head is cleaned, the amount of solvent vapor released around the print head can be reduced, and the smell of solvent vapor during cleaning of the print head can be reduced. In addition, according to the present invention, the ejection of the ink from the nozzle is started in a state where the print head is mounted in the head mounting unit, so that contamination of a periphery of the print head with the ink can be reduced.

BRIEF DESCRIPTION OF THE DRAWINGS

FIGS. 17A to 17C are timing charts showing a phase relationship between excitation signal and phase search charging voltage according to a fourth embodiment.

MODE FOR CARRYING OUT THE INVENTION

Hereinafter, specific embodiments of the present invention will be described with reference to the drawings. Incidentally, the present invention is not limited to the embodiments to be described below. In addition, in the following drawings, the same devices are denoted by the same numbers (reference signs), and a description of devices that have been already described may be omitted.

First Embodiment

<Use State>

Figure 1:
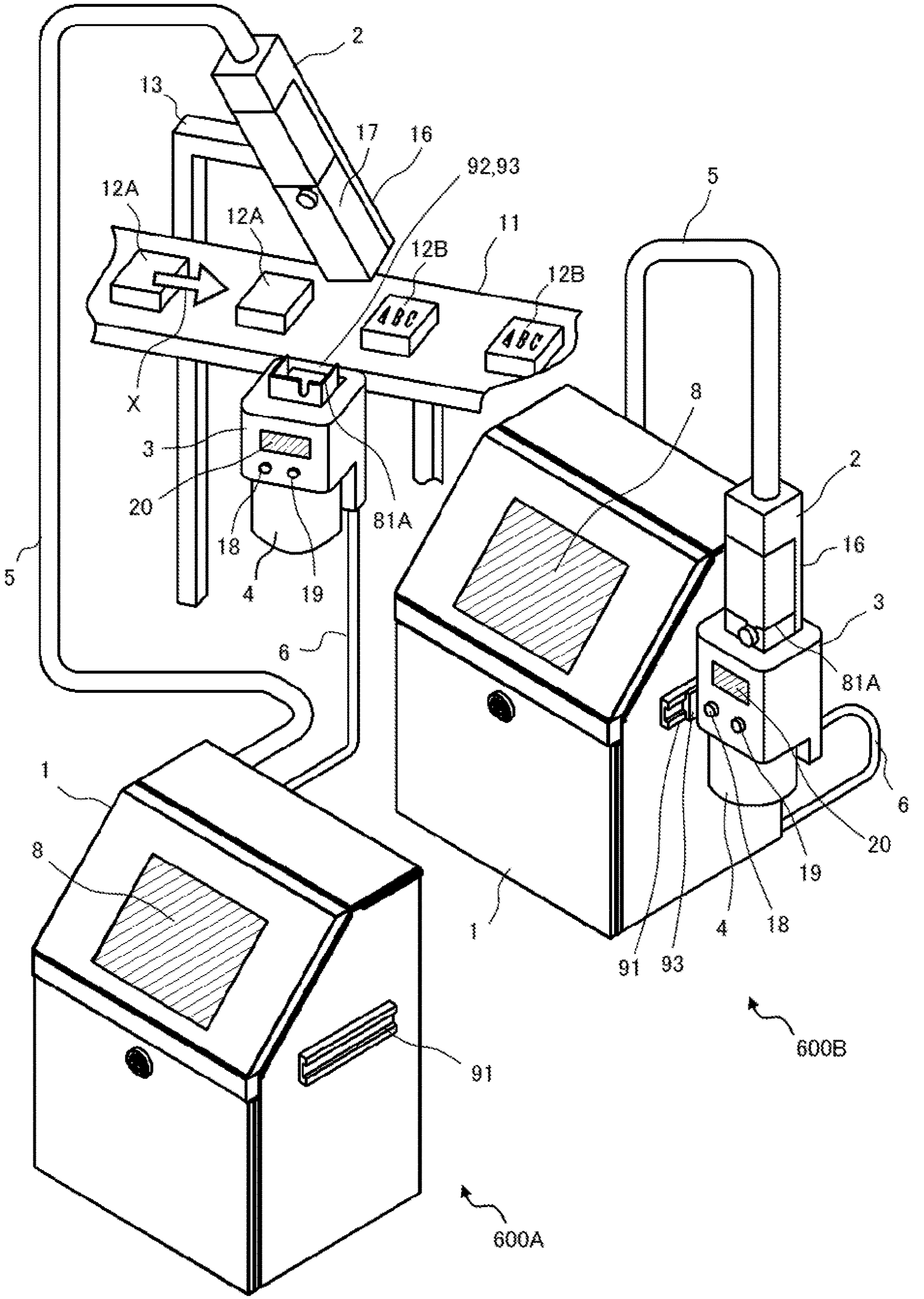
FIG. 1 is a perspective diagram showing a situation where an inkjet recording device according to an embodiment of the present invention is used.

First, a use state of an inkjet recording device according to a first embodiment of the present invention will be described with reference to FIG. 1. FIG. 1 is a perspective diagram showing a situation where the inkjet recording device according to the first embodiment of the present invention is used.

In FIG. 1, each of an inkjet recording device 600A and an inkjet recording device 600B includes a main body 1; a print head 2 connected to the main body 1 by a cable (for the print head) 5; and a head mounting unit 3 connected to the main body 1 by a cable (for the head mounting unit) 6. Here, the head mounting unit 3 basically has a function of containing the print head, but may additionally have a function of cleaning the print head by ejecting a cleaning liquid. The head mounting unit 3 to be described below is configured to additionally have the function of cleaning the print head. The inkjet recording device 600A shows a state where the print head 2 is installed at a production line. In addition, the inkjet recording device 600B shows a state where the print head 2 is removed from the production line and is mounted (set) in the head mounting unit 3. Incidentally, a collection container 4 attached to a lower portion of the head mounting unit 3 is provided to contain the liquid (cleaning liquid) after the print head is cleaned by the head mounting unit 3.

The inkjet recording device 600A is set up, for example, at a production line in a factory where food, beverages, or the like are produced, and the main body 1 is installed in a place where a space required for regular maintenance work or the like can be ensured. The print head 2 is fixed to a print head fixing bracket 13 installed in the vicinity of a belt conveyor 11, and is installed in proximity to a production line such as the belt conveyor 11 to perform printing on print objects 12A and 12B that are fed on the production line in a direction of arrow X. In addition, a protective cover 17 is attached to the print head 2 for the purpose of protecting components inside the print head 2. Incidentally, the print object 12B has been conveyed on the belt conveyor 11 after printing by the print head 2 has ended.

Incidentally, in FIG. 1, the main body 1 contains (holds) the ink for printing, and controls drive units (pumps or electromagnetic valves) inside the main body to supply the ink to the print head 2 via the cable (for the print head) 5. Incidentally, details of a path configuration inside the main body 1 or of a control unit will be described later. An operation display unit 8 is installed on an upper surface portion of the main body 1 and here, a touch input type display panel is used. By touching the operation display unit 8, an operator can instruct the control unit to start or stop the device, or can set contents to be printed on the print object 12A. In addition, in FIG. 1, in the print head 2, reference sign 16 indicates a head base, and reference sign 17 indicates a protective cover.

The head mounting unit 3 is installed around the print head 2. The head mounting unit 3 in the inkjet recording device 600A is fixed by combining a fitting portion 93 assembled to the head mounting unit 3, with a fixing jig 92 assembled to the belt conveyor 11. In addition, the head mounting unit 3 includes a head mounting portion 81A for mounting the print head 2 in the head mounting unit 3. Further, the head mounting unit 3 includes a start button 18 for starting a cleaning process of the print head 2; a stop button 19 for stopping the cleaning process of the print head 2; and a display portion 20 that allows a worker to recognize an alarm such as a confirmation message, a warning, or an abnormality. The display portion 20 may allow the worker to recognize an operating state or the presence or absence of an abnormality, for example, through the presence or absence of light of a light or a difference in color.

In the inkjet recording device 600A of the present embodiment, the head mounting unit 3 is fixed in the vicinity of the belt conveyor 11, but the head mounting unit 3 can be freely attached to a place where it is easy for a user to operate the head mounting unit 3. Incidentally, it is preferable that a length of the cable (for the head mounting unit) 6 connecting the main body 1 and the head mounting unit 3 is the same as or longer than that of the cable 5 connecting the main body 1 of the inkjet recording device 600 and the print head 2. This length setting is to ensure the degree of freedom in disposing the head mounting unit.

In addition, the main body 1 includes a fixing portion 91 for fixing the head mounting unit 3, and the head mounting unit 3 can also be used by removing the head mounting unit from the fixing jig (for the conveyor) 92 and by attaching the head mounting unit to the fixing portion 91. In a use state of the inkjet recording device 600B, the head mounting unit 3 can also be fixed to the main body 1 by combining the fitting portion 93 with the fixing portion 91 assembled to the main body 1. The head mounting unit 3 of the inkjet recording device 600B is attached to the main body 1. Since the head mounting unit 3 can be fixed to the main body 1, even when a space where the head mounting unit 3 is attached is not available in the vicinity of the belt conveyor 11 or the like, the head mounting unit 3 can be installed.

Next, in the inkjet recording device 600B, a state where the print head 2 is set in the head mounting unit 3 will be described. The print head 2 is mounted in the head mounting portion 81A of the head mounting unit 3 from a tip of the print head 2, and is set therein. In the inkjet recording device 600 according to the present embodiment, the print head 2 can be cleaned with a solvent 69A supplied from a main body 1 side via the cable (for the head mounting unit) 6, by setting the print head 2 in the head mounting unit in this way.

<Path Configuration>

Figure 2:
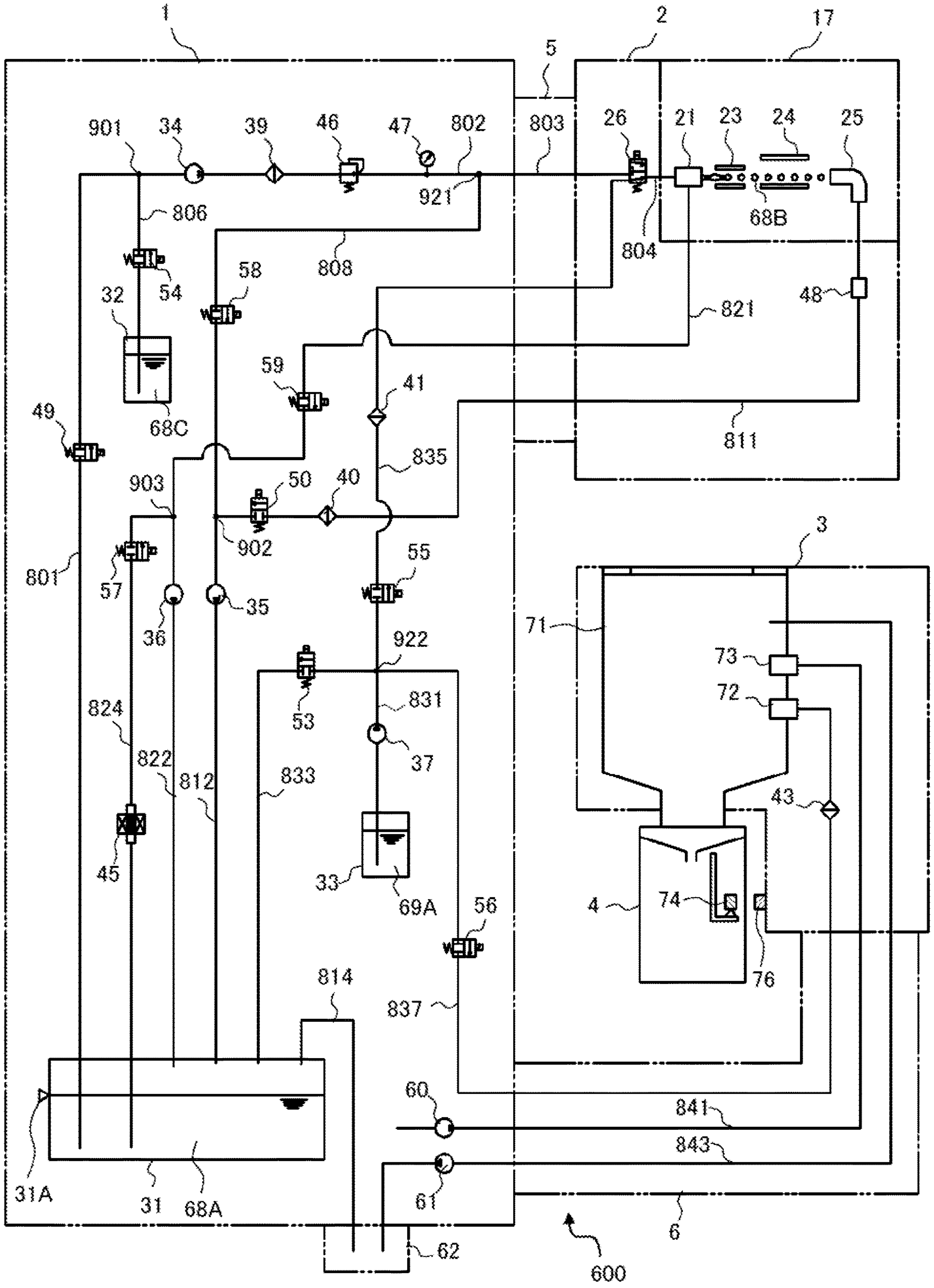
FIG. 2 is a diagram showing a path configuration of the inkjet recording device according to a first embodiment.

Next, a path configuration of the inkjet recording device 600 according to the first embodiment will be described with reference to FIG. 2. FIG. 2 is a diagram showing an overall path configuration of the inkjet recording device 600 according to the present embodiment.

First, ink supply paths (paths 801 to 804) of the inkjet recording device 600 according to the first embodiment will be described. In FIG. 2, the main body 1 is provided with an ink container 31 that holds ink 68A for performing printing. The ink container 31 is provided with a liquid level sensor 31A that detects whether or not the liquid (ink 68A) in the ink container 31 reaches a reference liquid level that is an amount appropriately held thereinside.

The ink container 31 is connected to the path (for supply) 801 at a portion immersed in the ink 68A, and an electromagnetic valve (for supply) 49 that opens and closes the path is installed in the middle of the path 801. Further, the path 801 is connected via a merge path 901 to a pump (for supply) 34 that is installed in the path 802 and that is used to suction and pressure-feed the ink 68A. In addition, the path 801 is connected to a filter (for supply) 39 that removes foreign matter mixed in the ink 68A, on an output side of a pump (for supply) 34 side.

The filter (for supply) 39 is connected to a pressure regulating valve 46 that regulates pressure of the ink 68A pressure-fed from the pump (for supply) 34, to a pressure appropriate for printing, and the pressure regulating valve 46 is connected to a pressure sensor 47 that measures a pressure of the ink 68A to be supplied to a nozzle 21. The path 802 in which the pressure sensor 47 is disposed is connected via a branch path 921 to the path 803 passing through the cable (for the print head) 5, and the path 803 is connected to a switching valve 26 that is provided inside the print head 2 to control whether or not to supply the ink 68A to the nozzle 21.

The switching valve 26 is connected via the path 804 to the nozzle 21 including a discharge port 21A that discharges the ink 68A. Incidentally, the switching valve 26 is a three-way electromagnetic valve, the path 802 for ink supply and a path 835 for nozzle cleaning are connected to the switching valve 26, and the switching valve 26 can switch between the supply of the ink 68A to and the supply of the solvent 69A to the nozzle 21. A charging electrode 23 that imparts a predetermined electric charge amount to ink particles 68B, a deflection electrode 24 that deflects the ink particles 68B to be used for printing, and a gutter 25 that captures the ink particles 68B that fly straight without being charged and deflected due to not being used for printing are disposed in a straight direction of the discharge port 21A of the nozzle 21.

Next, ink collection paths 811 and 812 of the inkjet recording device 600 will be described. In FIG. 2, the gutter 25 is connected to the path 811, and an electric charge sensor 48 that detects whether or not the ink particles 68B to which the electric charge amount has been imparted by the charging electrode 23 are collected is disposed in the path 811. In addition, the path 811 passes through the cable (for the print head) 5, and is connected to a filter (for collection) 40 that is disposed inside the main body 1 to remove foreign matter mixed in the ink, and the filter (for collection) 40 is connected to an electromagnetic valve (for collection) 50 that opens and closes the path.

The electromagnetic valve (for collection) 50 is connected to a pump (for collection) 35 that is disposed in the path 812 connected to the path 811 via a merge path 902, and that suctions the ink particles 68B captured by the gutter 25. The pump (for collection) 35 is connected the ink container 31. The ink particles 68B captured by the gutter 25 are collected in the ink container 31 by opening the electromagnetic valve 50 and by driving the pump 35.

Next, an exhaust path (path 814) of the inkjet recording device 600 according to the present embodiment will be described. The configuration is such that the path 814 is connected to an upper space of the ink container 31 that is not in contact with the ink 68A, and the path 814 is connected to an exhaust duct connection portion 62 communicating with the outside of the main body 1.

Next, ink circulation paths (paths 821 and 822) of the inkjet recording device 600 according to the present embodiment will be described. The nozzle 21 provided inside the print head 2 is connected to the path 821 passing through the cable (for the print head) 5, in addition to the path 804 for ink supply. An electromagnetic valve (for circulation) 59 provided inside the main body 1 to open and close the flow path is disposed in the path 821. The electromagnetic valve (for circulation) 59 is connected to the path 822 via a merge path 903, and a pump (for circulation) 36 that suctions the ink from the nozzle 21 is disposed in the path 822. In addition, the pump (for circulation) 36 is configured to be connected to the ink container 31.

Next, viscosity measurement paths (824 and 822) of the inkjet recording device 600 according to the present embodiment will be described. In FIG. 2, the ink container 31 is connected to the path (for viscosity measurement) 824 at a portion immersed in the ink 68A. The path (for viscosity measurement) 824 is connected to a viscometer 45 so as to identify a viscosity of the ink 68A in the ink container 31. The viscometer 45 is connected to an electromagnetic valve (for viscosity measurement) 57 that opens and closes the path. The electromagnetic valve (for viscosity measurement) 57 is configured to be connected via the merge path 903 to the pump (for circulation) 36 disposed in the path 822. Accordingly, a viscosity of the ink 68A can be measured by circulating the ink 68A in the ink container 31 through the viscosity measurement path. The viscosity measured in this way is input to a control unit 7 (not shown in FIG. 2 and refer to FIG. 3), and is used to control the viscosity of the ink 68A in the ink container 31.

Next, solvent replenishment paths (paths 831 and 833) of the inkjet recording device 600 according to the present embodiment will be described. In FIG. 2, the main body 1 is provided with a solvent container 33 that holds the solvent 69A used to replenish the solvent to the ink container 31, to clean the nozzle, or to clean the head. The solvent container 33 is connected to the path 831 at a portion immersed in the solvent 69A, and a pump (for the solvent) 37 used to suction and pressure-feed the solvent is disposed in the path 831. In addition, the pump (for the solvent) 37 is connected to a branch path 922 for changing a supply destination of the solvent 69A depending on the purpose. The branch path 922 is connected to an electromagnetic valve (for solvent replenishment) 53 that is disposed in the path 833 among the solvent replenishment paths to open and close the flow path, and the electromagnetic valve (for solvent replenishment) 53 is configured to be connected to the ink container 31. The viscosity of the ink 68A in the ink container 31 is controlled by use of these paths and by control of the control unit 7.

Next, an ink replenishment path 806 of the inkjet recording device 600 according to the present embodiment will be described. In FIG. 2, the main body 1 is provided with an auxiliary ink container 32 that holds ink 68C for replenishment. The auxiliary ink container 32 is connected to the path 806 at a portion immersed in the ink 68C. The path 806 is connected to an electromagnetic valve (for ink replenishment) 54 that opens and closes the path, and the electromagnetic valve (for ink replenishment) 54 is connected via the merge path 901 to the pump (for supply) 34 that is installed in the path 801 to suction and pressure-feed the ink 68C. In addition, the ink 68C in the auxiliary ink container 32 is replenished to the ink container 31 via the nozzle 21 and via the gutter 25, the path 811, the electromagnetic valve 50, and the pump 35.

Next, nozzle cleaning paths (paths 831 and 835) of the inkjet recording device 600 according to the present embodiment will be described. In FIG. 2, the pump (for the solvent) 37 disposed in the path 831 is connected to the path 835 via the branch path 922. The path 835 is connected to an electromagnetic valve (for nozzle cleaning) 55 that opens and closes the flow path. In addition, the electromagnetic valve (for nozzle cleaning) 55 is connected to a filter (for nozzle cleaning) 41 that removes foreign matter mixed in the solvent 69A. The filter (for nozzle cleaning) 41 is configured to be connected to the switching valve 26 that is provided inside the print head 2 to control whether or not to feed the solvent 69A for cleaning to the nozzle 21, via the path 821 passing through the cable (for the print head) 5.

Next, main body circulation paths (paths 808 and 812) of the inkjet recording device 600 according to the present embodiment will be described. The path 802 is connected to the path 808 via the branch path 921. The path 808 is connected to an electromagnetic valve (for main body circulation) 58 that opens and closes the path, and the electromagnetic valve (for main body circulation) 58 is connected via the merge path 902 to the pump (for circulation) 35 installed in the path 812.

Next, head cleaning paths (paths 831 and 837) of the inkjet recording device 600 according to the present embodiment will be described. In FIG. 2, the pump (for the solvent) 37 is connected to the path 837 via the branch path 922, an electromagnetic valve (for head cleaning) 56 that opens and closes the flow path is disposed in the path 837, and the electromagnetic valve (for head cleaning) 56 is connected to a filter (for head cleaning) 43 that removes foreign matter mixed in the solvent 69A.

The filter (for head cleaning) 42 is connected to the filter (for head cleaning) 43 that is provided inside the head mounting unit 3 to remove foreign matter that initially enters the path 837, via the path 822 passing through the cable (for the head mounting unit) 6. In addition, an output side of the filter (for head cleaning) 43 is connected to a cleaning nozzle 72 provided inside a cleaning tank 71 of the head mounting unit 3. Here, a space inside the cleaning tank 71 is configured to communicate with the collection container 4 installed on a lower portion of the cleaning tank 71. The collection container 4 is provided to store the cleaning liquid (solvent) ejected from the cleaning nozzle 72 that is grounded, after cleaning with the solvent has been performed in the cleaning tank 71. A float 74 that detects a liquid level of the solvent after cleaning is provided inside the collection container 4. When the float 74 with a built-in magnet reaches a predetermined liquid level, a magnetic sensor A 76 detects a liquid level, and outputs that the cleaning liquid in the collection container 4 has reached the predetermined liquid level, to the control unit (not shown in FIG. 2).

Next, an air supply path (path 841) of the inkjet recording device 600 according to the present embodiment will be described. In FIG. 2, the main body 1 is provided with a pump (for drying) 60 used to suction and pressure-feed air, and the pump (for drying) 60 forms an air suction port communicating with the inside of the main body 1. The pump (for drying) 60 is connected to an air supply nozzle 73 provided inside the cleaning tank 71 of the head mounting unit 3, via the path 841 passing through the cable (for the head mounting unit) 6.

Next, an air suction path (path 843) of the inkjet recording device 600 according to the present embodiment will be described. The cleaning tank 71 provided inside the head mounting unit 3 is connected to an air pump (for suctioning) 61 that is provided inside the main body 1 and that is used to suction and pressure-feed air, via the path 843 passing through the cable (for the head mounting unit) 6. In addition, the pump (for suctioning) 61 is configured to be connected to the exhaust duct connection portion 62 communicating with the outside of the main body 1.

<Configuration of Control Unit>

Figure 3:
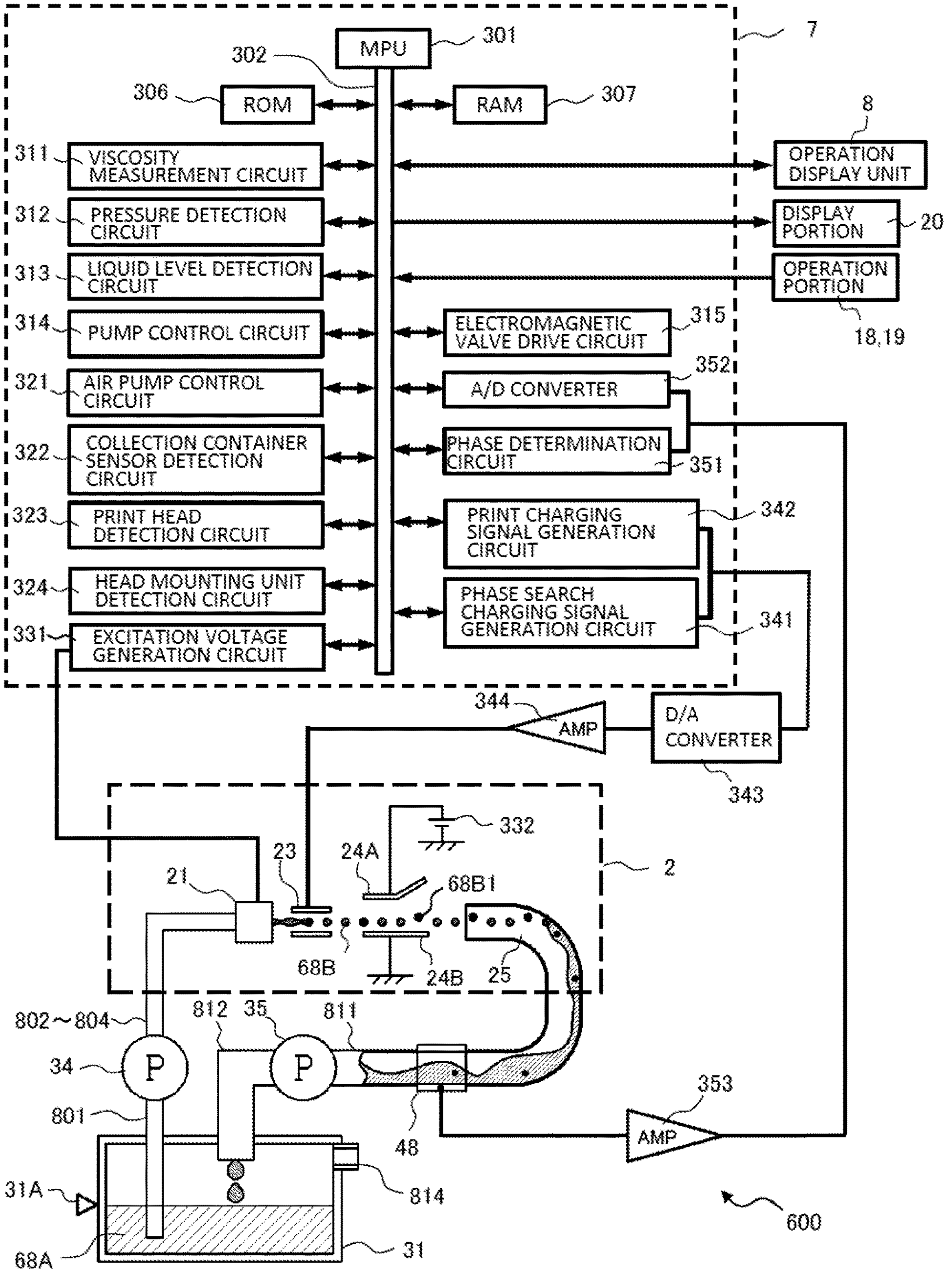
FIG. 3 is a diagram showing a configuration of a control unit of the inkjet recording device according to the first embodiment.

Next, a configuration of the control unit 7 of the inkjet recording device 600 according to the present embodiment will be described. FIG. 3 is a diagram showing a schematic configuration of the control unit 7 and a printing mechanism unit (the main body 1 and the print head 2) of the inkjet recording device 600 according to the present embodiment. In FIG. 3, reference sign 301 is a micro processing unit (hereinafter, referred to as MPU) that is a control unit that controls the entirety of the inkjet recording device 600. Reference sign 302 is a bus line, and the bus line has a function of transmitting data, control signals, or the like between various devices forming the control unit. For example, the bus line 302 is used to receive data, a detection signal, or the like required for calculation of the MPU 301 from each device, and to transmit a data signal, an address signal, and a control signal to each device. Reference sign 306 is a read only memory (ROM) that stores a control program and data required for operation of the MPU 301. Reference sign 307 is a random access memory (RAM) that temporarily stores data required during execution of the program by the MPU 301. Reference sign 8 is an operation display unit to which print contents, set values, or the like are input, and which displays input data, the print contents, and the like. Here, a touch input type display panel in which transparent touch switches are superimposed on a surface of a liquid crystal display screen is used as the operation display unit 8.

In addition, the head mounting unit 3 can be controlled from the operation display unit of the control unit 7, but operation portions (the start button 18 and the stop button 19) are used when an operation to operate the head mounting unit 3 is performed near the head mounting unit 3 instead of through the operation display unit 8. In addition, the display portion 20 is used when checking an operating state, an abnormality message, or the like related to the head mounting unit 3 near the head mounting unit 3 instead of through the operation display unit 8.

The print head 2 of the inkjet recording device 600 includes the nozzle 21 that atomizes the ink 68A pressurized and supplied from the ink container 31, and that discharges the ink particles. The nozzle 21 ejects the ink in a columnar shape, and the ink is separated at a tip and is discharged as the ink particles 68B. In addition, the print head 2 includes the charging electrode 23 so as to surround the ink particles 68B, and charges the ink particles 68B according to print contents.

Further, the print head 2 deflects the ink particles 68B charged by the charging electrode 23 and flying, according to a charging amount, and causes the ink particles 68B to fly toward the print object (not shown). In addition, the flying ink particles impact the print object to execute printing. The deflection electrode 24 of the print head 2 is formed of a ground electrode 24B and a positive electrode 24A. In addition, the print head 2 includes the gutter 25 that captures the ink particles 68B (unused ink) that have not been used for printing, and the electric charge sensor 48 that generates a phase detection signal corresponding to a charging amount of ink particles 68B1 with very small electric charge among the ink particles 68B captured by the gutter 25. In addition, the pump (for collection) 35 that collects the ink (ink particles) captured by the gutter 25, in the ink container 31, and the ink collection paths 811 and 812 connecting the gutter 25 and the ink container 31 are provided on the main body 1 side.

In addition, the control unit 7 includes an excitation voltage generation circuit 331 that excites an electrostrictive element 22 (not shown) built in the nozzle 21, to provide regularity at the timing when the ink particles 68B are separated from the ink column ejected from the nozzle 21.

In addition, the control unit 7 includes a print charging signal generation circuit 342 and a phase search charging signal generation circuit 341, and includes a D/A converter 343 that converts charging signals in a digital signal form output from these generation circuits, into voltage signals in an analog form, and an amplification circuit 344 that amplifies the voltage signals in an analog signal form output from the D/A converter 343, and that generates a charging voltage to be applied to the charging electrode 23. Incidentally, instead of a configuration in which the print charging signal generation circuit 342 and the phase search charging signal generation circuit 341 are provided, the control unit may use only the print charging signal generation circuit 342 to realize charging amount control. In addition, the inkjet recording device 600 includes a deflection voltage generation circuit 332 that generates a deflection voltage to be applied to the deflection electrode 24.

In addition, the inkjet recording device 600 includes an amplification circuit 353 that amplifies a phase detection signal in an analog signal form output from the electric charge sensor 48, a phase determination circuit 351 that receives the amplified phase detection signal to determine whether or not charging is good, and an A/D converter 352 that receives and A/D converts the amplified phase detection signal.

Next, in FIG. 3, the MPU 301 of the control unit 7 is connected via the bus line 302 to a liquid level detection circuit 313 for managing a liquid level of the ink container 31, to a pressure detection circuit 312 for detecting whether or not a pressure of the ink to be supplied to the nozzle 21 is an appropriate value, to a viscosity measurement circuit 311 for allowing the viscometer 45 to measure whether or not a viscosity of the ink 68A to be supplied to the nozzle 21 is a value appropriate for printing, to a pump control circuit 314 for controlling each of the pumps 34 to 37 that are disposed inside the main body 1 to suction and pressure-feed the ink 68A or the solvent 69A, and to an electromagnetic valve drive circuit 315 for controlling an opening and closing operation of each of the electromagnetic valves 49, 50, and 53 to 59 of the paths, and controls each part.

In addition, the MPU 301 is connected via the bus line 302 to an air pump control circuit 321 for controlling the pumps 60 and 61, to a collection container sensor detection circuit 322 for detecting that the collection container 4 is mounted in the head mounting unit 3 or that the amount of a liquid 70 in the collection container 4 is not larger than a predetermined amount, using the magnetic sensor A 76 and a magnet A 75, to a print head detection circuit 323 for allowing a head mounting unit 3 side to detect that the print head 2 is mounted in the head mounting unit 3, using a magnetic sensor B 84 and a Magnet B 86, and to a head mounting unit detection circuit 324 for allowing a print head 2 side to detect that the print head 2 is mounted in the head mounting unit 3, using a magnetic sensor C 28 and a magnet C 87, and controls each part.

Incidentally, a computer can be used as the control unit 7. Specifically, the control unit 7 can be formed of the MPU 301; the memories (306 and 307) that store the program for operation of the MPU 301 and data and information required for operation; and the drive unit that operates the components inside the print head 2, the head mounting unit 3, and the main body 1 according to an instruction of the MPU 301. Here, a detailed description of the control unit 7 will be omitted.

<Configuration of Head Mounting Unit>

Figure 4:
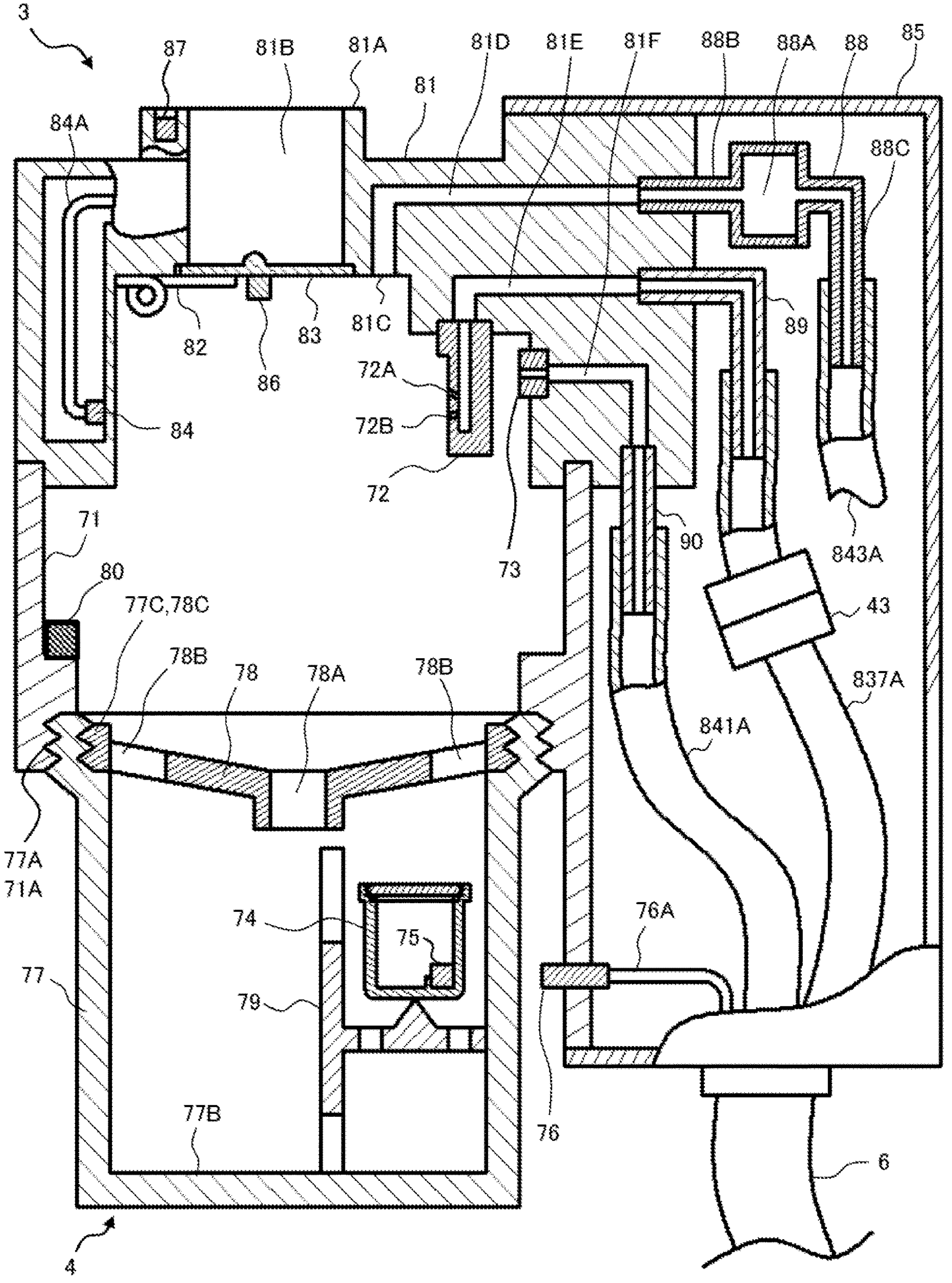
FIG. 4 is a cross-sectional diagram showing a configuration of a head mounting unit according to the first embodiment.
Figure 5:
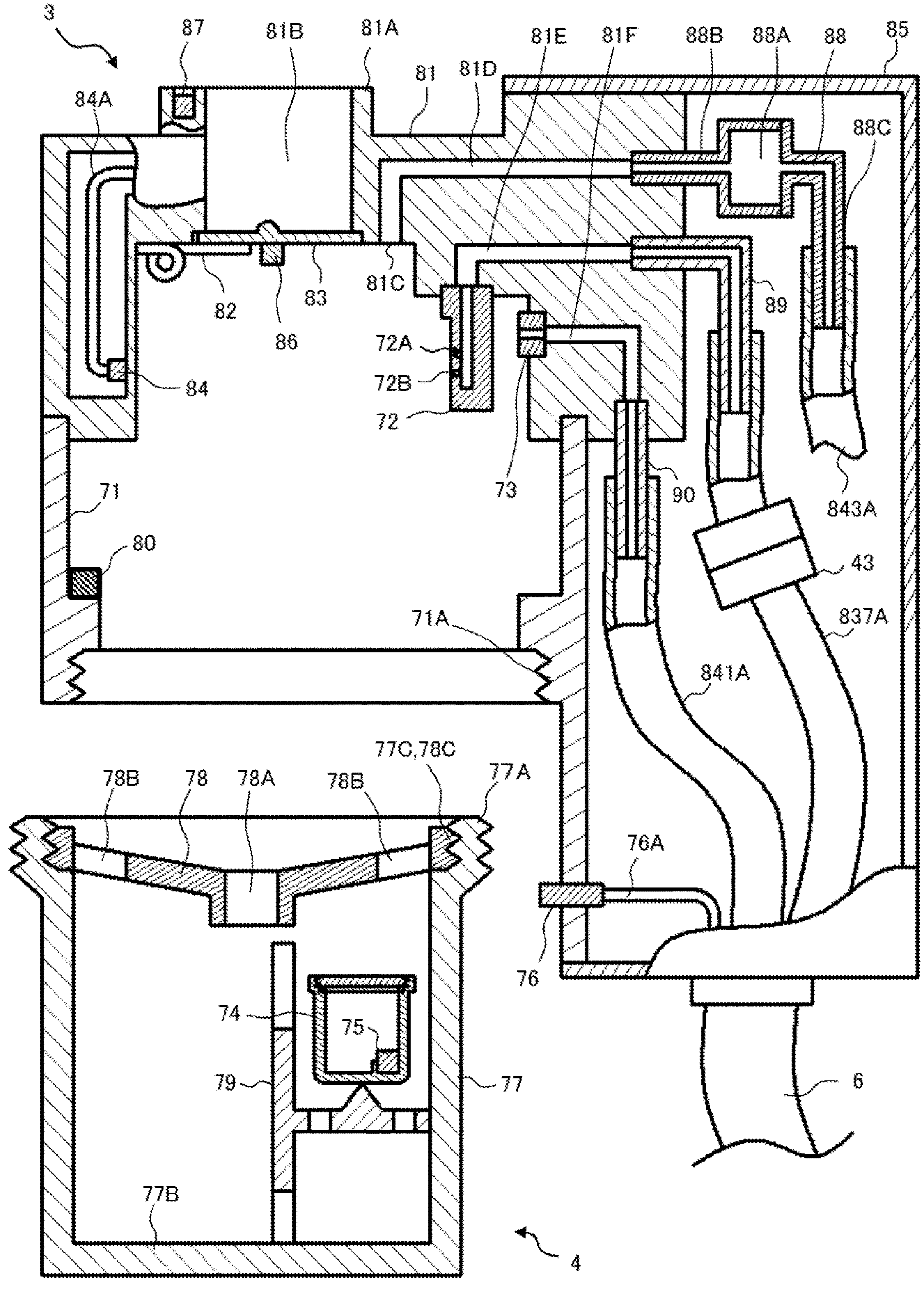
FIG. 5 is a diagram showing a state where a collection container is removed from the head mounting unit.
Figure 6:
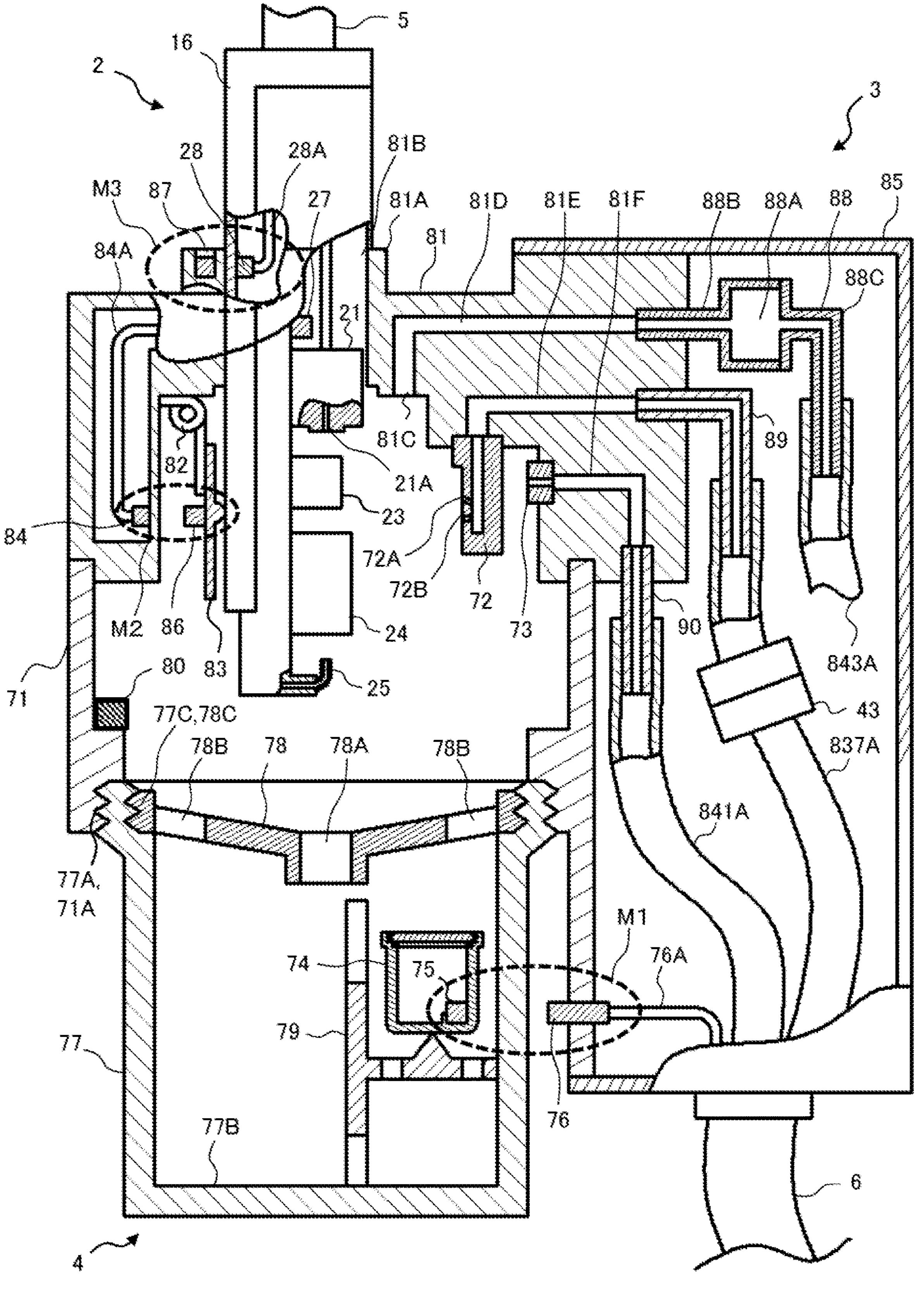
FIG. 6 is a diagram showing a state where a print head is mounted in the head mounting unit.

Next, a detailed configuration of the head mounting unit 3 of the inkjet recording device 600 according to the first embodiment will be described with reference to FIGS. 4 to 6. FIG. 4 is a configuration diagram of the head mounting unit 3 (cross-sectional diagram of the cleaning nozzle 72). FIG. 5 is a cross-sectional diagram of the head mounting unit showing a state where the collection container is removed from the head mounting unit 3. FIG. 6 is a cross-sectional diagram of the head mounting unit showing a state where the print head is mounted.

First, the configuration of the head mounting unit will be described with reference to FIG. 4. In FIG. 4, the head mounting unit 3 includes the cleaning tank 71 that contains the print head 2 during head cleaning; a cleaning block 81 formed of the head mounting portion 81A that is installed on an upper portion of the cleaning tank 71 and that is used to set the print head 2 in the head mounting unit 3, and a head insertion portion 81B that is an entrance used when inserting the print head 2 into the cleaning tank 71; and the collection container 4 that stores the liquid 70A that has been used for a head cleaning process.

A lid member 83 is assembled to the cleaning block 81 such that foreign matter such as dust does not enter the cleaning tank 71 from the head insertion portion 81B that is an opening portion, when the print head 2 is not set in the head insertion portion 81B. The lid member 83 is assembled to the cleaning block 81 through a lid hinge 82. The Magnet B 86 used when detecting that the print head 2 is set in the head mounting unit 3 is assembled to the lid member 83. The magnetic sensor B 84 that detects that the Magnet B 86 has approached within a certain distance when the print head 2 is set in the head mounting unit 3 is assembled to the cleaning block 81. In addition, the magnet C 87 used when detecting that the print head 2 is set in the head mounting unit 3 is assembled to the cleaning block 81.

In addition, the cleaning nozzle 72 that discharges the solvent 69A for head cleaning toward the print head 2 and a supply nozzle 73 including an air discharge port that blows air to dry the print head 2 wetted with the solvent 69A after head cleaning are assembled to the cleaning block 81 by press-fitting.

The cleaning nozzle 72 forms a liquid discharge hole A portion 72A that ejects the solvent 69A so as to aim at the nozzle 21 assembled to the print head 2, and a liquid discharge hole B portion 72B that ejects the solvent 69A so as to aim at the deflection electrode 24. In addition, the cleaning nozzle 72 is connected to a flow path B portion 81E formed in the cleaning block 81.

The air supply nozzle 73 forms an air discharge hole 73A that ejects air so as to aim at a gap between electrodes of the charging electrode 23 assembled to the print head 2. The air supply nozzle 73 is connected to a flow path C portion 81F formed in the cleaning block 81. Further, the cleaning block 81 forms a hole portion 81C communicating with the inside of the cleaning tank 71 into which the print head 2 is inserted during head cleaning, and a flow path A portion 81D connected to the hole portion 81C.

In addition, the head mounting unit 3 includes the cleaning tank 71 that contains the print head 2 during head cleaning, on a lower portion of the cleaning block 81. The cleaning tank 71 forms a side wall portion formed to prevent the solvent 69A ejected from the cleaning nozzle 72, from being scattered around, and an attachment portion 71A used when the collection container 4 is mounted. In addition, a temperature sensor B 80 that detects an ambient temperature of the head mounting unit 3 for use in various control is assembled inside the cleaning tank 71. Furthermore, the magnetic sensor A 76 that detects that the collection container 4 is attached to the head mounting unit 3 is assembled to the cleaning tank 71.

Furthermore, the head mounting unit 3 includes the collection container 4 that contains the liquid 70A that has been used for head cleaning, on the lower portion of the cleaning tank 71. The collection container 4 is formed of a container 77 that contains the liquid 70A; a partition 78 attached to reduce the scattering of the liquid 70A when the collection container 4 is carried; the float 74 to which the magnet A 75 is assembled; and a holder 79 that suppresses a motion of the float 74.

The container 77 forms a liquid storage portion 77B that contains the liquid 70A that has been used for the head cleaning process, an attachment portion 77A used when fixing the container 77 to the cleaning tank 71, and an inner screw portion 77C for attaching the partition 78. The partition 78 forms a liquid inflow hole portion 78A provided to allow the liquid 70A dripping from the cleaning tank 71 to flow into the container 77, and a liquid outflow hole portion 78B provided to allow the liquid 70A to flow out from the container 77 when the collection container 4 is tilted.

In addition, a liquid joint 89 connected to the flow path B portion 81E is assembled to the cleaning block 81, and a tube 837A is connected to the liquid joint 89 by a method such as press-fitting. The tube 837A forms a part of the head cleaning path 837, and the cleaning block 81 is connected to the solvent container 33 inside the main body 1 via the tube 837A. In addition, an air joint 90 connected to the flow path C portion 81F is assembled to the cleaning block 81, and a tube 841A is connected to the air joint 90 by a method such as press-fitting. The tube 841A forms a part of the path (for air supply) 841, and the cleaning block 81 is connected to the pump (for drying) 60 via the tube 841A.

Furthermore, a suction joint 88 connected to the flow path A portion 81D is assembled to the cleaning block 81, and a tube 843A is connected to the suction joint 88 by a method such as press-fitting. The tube 841A forms a part of the path (for air suction) 841, and the cleaning block 81 is connected to the pump (for suctioning) 61 via the tube 841A. The suction joint 88 is formed by joining a joint A portion 88B and a joint B portion 88C, and forms a chamber 88A between the joint A portion 88B and the joint B portion 88C.

In addition, the head mounting unit 3 is covered with a cover 85 such that the tube 837A, the tube 841A, and the tube 843A are not exposed to the outside of the head mounting unit 3, and the cover 85 is fixed to sandwich an upper portion of the cleaning block 81 and the lower portion of the cleaning tank 71. The cable (for the head mounting unit) 6 is assembled to a lower portion of the cover 85 so as not to protrude outward and to interfere with other production equipment. In addition to the tube 837A, the tube 841A, and the tube 843A, an electric wire 76A connected to the magnetic sensor A 76, an electric wire 84A connected to the magnetic sensor B 84, an electric wire connected to the temperature sensor B 80, a harness (not shown) for operating the start button 18, the stop button 19, and the display portion 20, and the like pass through the cable (for the head mounting unit) 6, and connect the head mounting unit 3 and the main body 1.

Next, a state where the collection container 4 is removed from the head mounting unit 3 will be described with reference to FIG. 5. In the inkjet recording device 600, when the collection container 4 is rotated by approximately 90° in a state where the head mounting unit 3 is fixed, the attachment portion 71A of the head mounting unit 3 and the attachment portion 77A of the collection container 4 fitted to the attachment portion 71A are removed from each other, and the collection container 4 can be separated from the head mounting unit 3. In this state, the magnet A 75 assembled inside the float 74 and the magnetic sensor A 76 assembled to the cleaning tank 71 are apart from each other by a certain distance (distance at which the magnetic sensor A 76 cannot recognize the magnet A 75) or more. This state is transmitted to the control unit 7 via the electric wire 76A. For this reason, the control unit 7 can recognize that the collection container 4 is removed from the head mounting unit 3.

Next, a state where the print head 2 is mounted in the head mounting unit 3 will be described with reference to FIG. 6. The lid member 83 of the head mounting unit 3 is opened by inserting the print head 2 from which the protective cover 17 is removed, into the head insertion portion 81B. The print head 2 is pushed to a position where the nozzle 21, the charging electrode 23, the deflection electrode 24, and the gutter 25 reach a space surrounded by the cleaning tank 71 and the cleaning block 81.

In addition, an inner wall surface of a hole of the head insertion portion 81B and an outer wall surface of a head base 16 of the print head 2 are fitted to each other such that a position of the head mounting unit 3 with respect to the print head 2 is not offset to left, right, front, and back directions. Furthermore, the print head 2 stops at a position where a part of the print head 2 comes into contact with the head mounting portion 81A formed in the cleaning block 81, so that a position of the print head 2 when set in the head mounting unit 3 is stabilized. In addition, the magnetic sensor C 28 and a temperature sensor A 27 are assembled to the print head 2 of the present embodiment. An electric wire 28A connected to the magnetic sensor C 28 and an electric wire 27A connected to the temperature sensor A 27 are connected to the control unit 7 installed in the main body 1, through the cable (for the print head) 5.

In a state where the print head 2 is mounted in the head mounting unit 3, when the lid member 83 is opened by the print head 2, the Magnet B 86 assembled to the lid member 83 also moves in conjunction therewith, and as surrounded and indicated by a dotted line circle M2, the Magnet B 86 and the magnetic sensor B 84 approach each other within the certain distance. Accordingly, the head mounting unit 3 side can recognize that the print head 2 is mounted in the head mounting unit 3. Furthermore, in a state where the print head 2 is mounted in the head mounting unit 3, as surrounded and indicated by a dotted line circle M3, the magnet C 87 assembled to the cleaning block 81 and the magnetic sensor C 28 assembled to the print head 2 approach each other within a certain distance, and accordingly, the print head 2 side can also recognize that the print head 2 is mounted in the head mounting unit 3. In this way, whether or not the print head 2 is mounted in the head mounting unit 3 is checked by two sensors, so that erroneous detection caused by a component failure is prevented.

In addition, in a state where the collection container 4 is mounted in the head mounting unit 3, as surrounded and indicated by a dotted line circle M1, the magnet A 75 assembled to the float 74 of the collection container 4 and the magnetic sensor A 76 assembled to the cleaning tank 71 of the head mounting unit approach each other within the certain distance. The magnetic sensor A 76 detects this state, and accordingly, the control unit 7 can recognize that the collection container 4 is mounted in the head mounting unit 3. This detection can prevent erroneous work such as starting the head cleaning process without mounting the collection container 4.

<Head Cleaning and Drying Process>

An operation of the inkjet recording device 600 according to the first embodiment when the head cleaning process and a head drying process are executed in a state where the print head 2 is set in the head mounting unit 3 will be described with reference to FIGS. 7 to 11.

Figure 7:
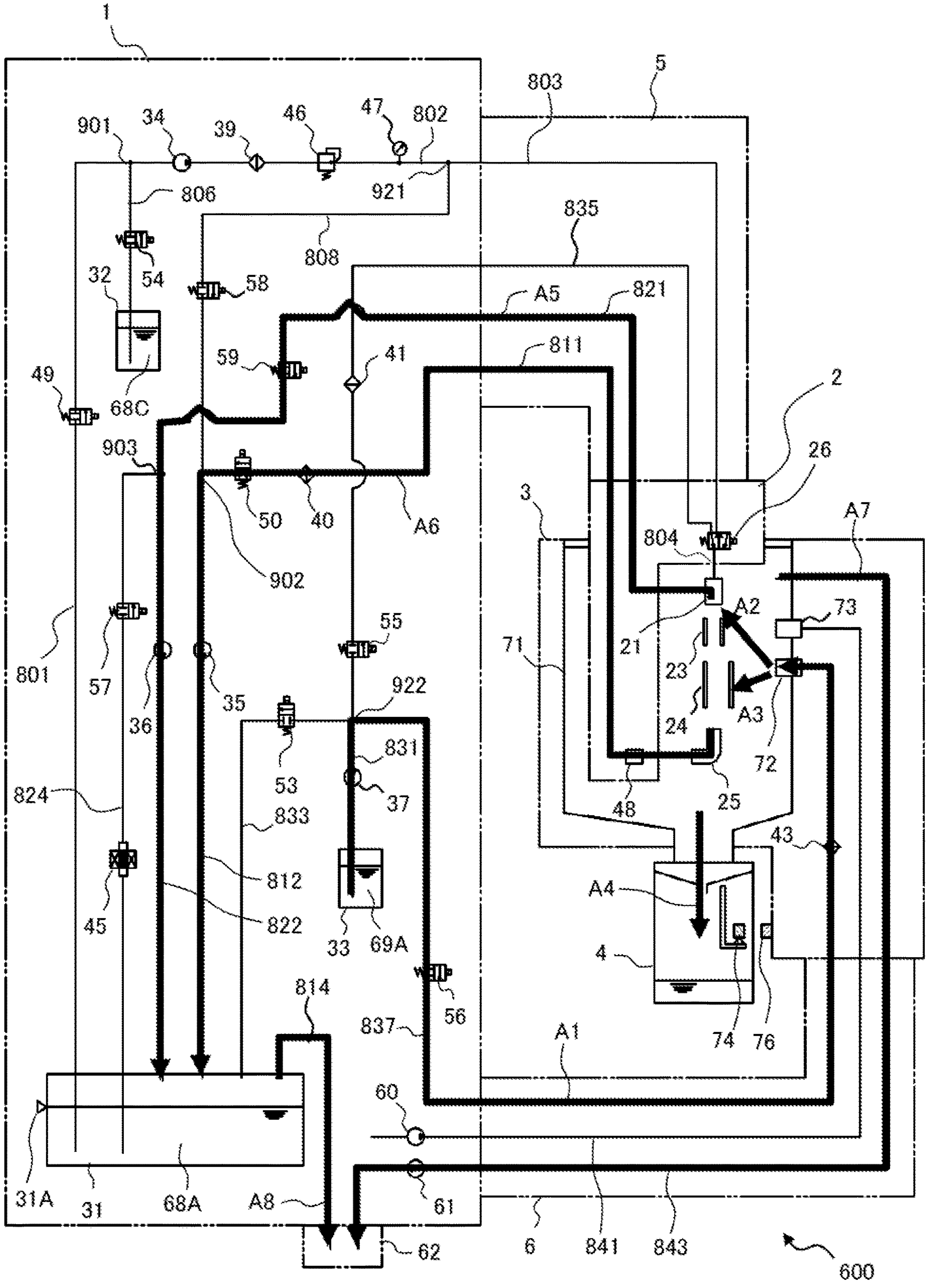
FIG. 7 is a fluid path diagram showing liquid flows and gas flows of the entire device in thick lines when a head cleaning process of the first embodiment is performed.
Figure 8:
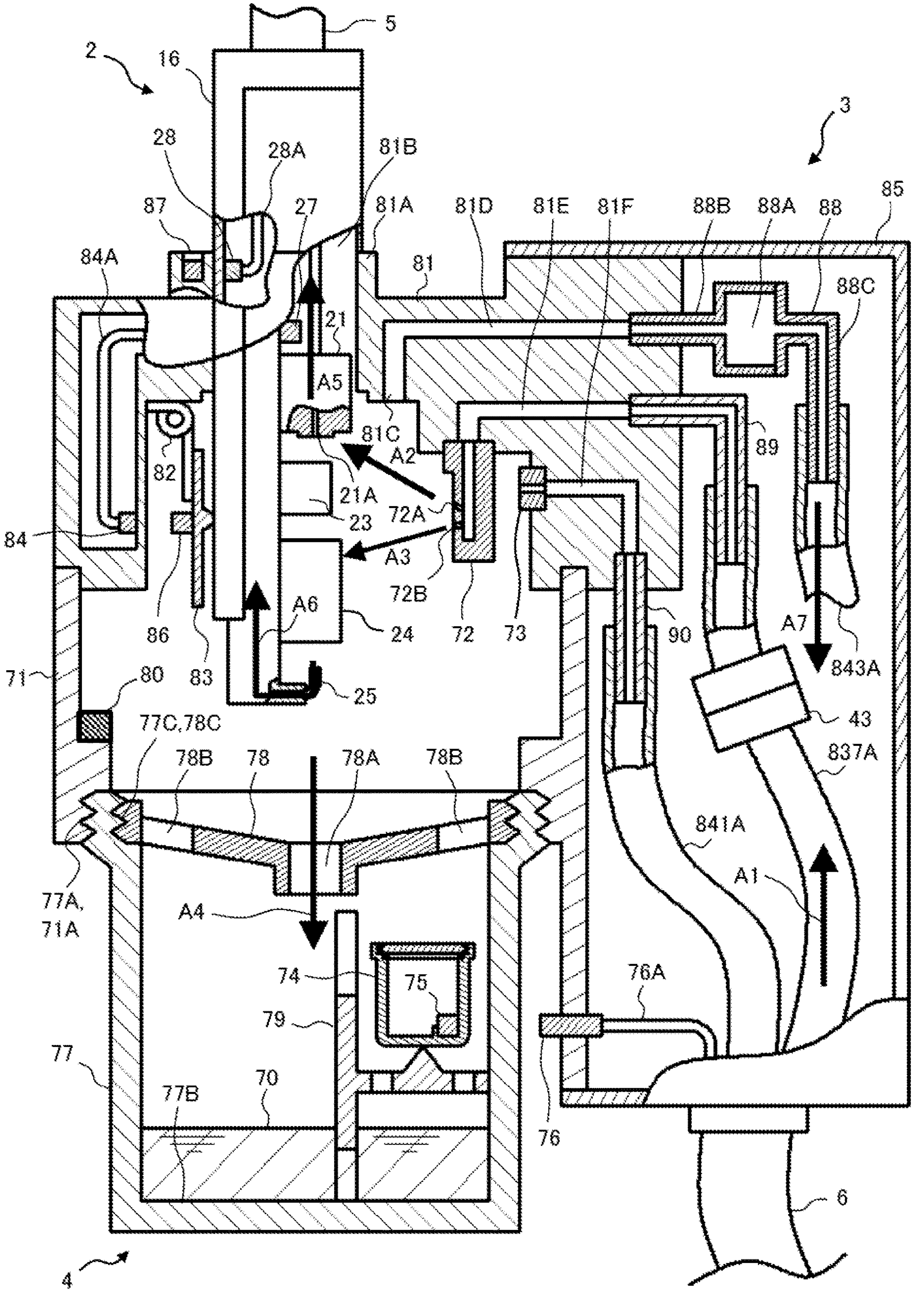
FIG. 8 is a cross-sectional diagram of the head mounting unit showing liquid flows and gas flows inside the head mounting unit in thick lines when the head cleaning process of the first embodiment is performed.

First, an operation of the inkjet recording device 600 when the head cleaning process is executed will be described with reference to FIGS. 7 and 8. FIG. 7 is a fluid path diagram showing liquid flows and gas flows of the entire device in thick lines (A1 to A8) when the head cleaning process is performed. FIG. 8 is a cross-sectional diagram of the head mounting unit showing liquid flows and gas flows inside the head mounting unit 3 in thick lines (A1 to A7) when the head cleaning process is performed.

In FIGS. 7 and 8, the inkjet recording device 600 is in a state where the print head 2 is set (mounted) in the head mounting unit 3 for the cleaning of the print head. In the head cleaning paths (the path 831 and the path 837), the electromagnetic valve (for head cleaning) 56 is energized to open the flow path, and the pump (for the solvent) 37 is operated, so that as indicated by a thick line of arrow A1, the solvent that is a cleaning liquid is supplied to the head mounting unit 3. Namely, the solvent 69A contained in the solvent container 33 of the main body 1 can be supplied to the cleaning nozzle 72 assembled in the cleaning tank 71 of the head mounting unit 3.

The cleaning nozzle 72 ejects (discharges) the solvent 69A toward the print head to clean the print head 2. Specifically, the solvent 69A supplied to the cleaning nozzle 72 can clean stains caused by the ink 68A that has adhered during operation or maintenance of the inkjet recording device 600 by ejecting the solvent 69A in a direction indicated by arrow A2 (direction in which the solvent 69A is ejected from the liquid discharge hole A portion 72A so as to aim at the nozzle 21) and in a direction indicated by arrow A3 (direction in which the solvent 69A is ejected from the liquid discharge hole B portion 72B so as to aim at the deflection electrode 24), and by blowing the solvent 69A onto components such as the nozzle 21 and the deflection electrode 24 assembled to the print head 2. The solvent 69A that has cleaned the components such as the nozzle 21 and the deflection electrode 24 assembled to the print head 2 drips and flows downward due to gravity. In a state where the print head 2 is set in the head mounting unit 3, the gutter 25 disposed below the charging electrode 23 or the deflection electrode 24 can be cleaned with the solvent 69A.

In addition, in the head cleaning process, the solvent 69A that has cleaned components such as the nozzle 21, the charging electrode 23 and the deflection electrode 24 disposed in the print head 2 and the gutter 25 drips in a direction indicated by arrow A4, flows to the collection container 4 installed on the lower portion of the head mounting unit 3, and is stored in the liquid storage portion 77B as the liquid 70A.

In addition, in the ink circulation paths (821 and 822), the electromagnetic valve (for circulation) 59 is energized to open the flow path, and the pump (for circulation) 36 is operated, so that as indicated by a thick line of arrow A5, some of the solvent 69A that has hit the nozzle 21 is suctioned from the nozzle 21 and is collected in the ink container 31 of the main body 1. In this way, in the head cleaning process, the inside of the nozzle 21 and the ink circulation paths 821 and 822 can also be cleaned with the solvent 69A.

Furthermore, in the ink collection paths (811 and 812), the electromagnetic valve (for collection) 50 is energized to open the flow path, and the pump (for collection) 35 is operated, so that as indicated by a thick line of arrow A6, some of the solvent 69A that has hit the gutter 25 is suctioned from the gutter 25 and is collected in the ink container 31 of the main body 1. In this way, in the head cleaning process, the inside of the gutter 25 and the ink collection paths 811 and 812 can also be cleaned with the solvent 69A.

In addition, at the nozzle 21 and the gutter 25, ambient air is suctioned together with the solvent 69A. The air suctioned at this time dissolves the vaporized solvent 69A and becomes solvent vapor in the ink circulation paths 821 and 822 and in the ink collection paths 811 and 812. After the solvent vapor has flowed into the ink container 31, the solvent vapor is discharged to the exhaust duct connection portion 62 communicating with the outside of the main body 1, via the path 814.

In the air suction path (path 841), the pump (for suctioning) 61 is operated, so that as indicated by a thick line of arrow A7, solvent vapor generated in the cleaning tank 71 of the head mounting unit 3 is suctioned from the hole portion 81C and is discharged to the exhaust duct connection portion 62 communicating with the outside of the main body 1. The inkjet recording device 600 is configured such that the solvent vapor discharged from the ink container 31 and the solvent vapor discharged from the head mounting unit 3 are collectively discharged from the exhaust duct connection portion 62. The exhaust duct connection portion 62 is at a place apart from the operation display unit 8 of the main body 1, and is assembled to, for example, a back surface or a bottom surface of the main body 1.

In addition, there is a possibility that some of the solvent 69A ejected from the cleaning nozzle 72 flows into the flow path A portion 81D from the hole portion 81C. For this reason, the chamber 88A is provided in the air suction path (refer to FIG. 4), and traps the solvent 69A that has flowed into the flow path A portion 81D, so as not to flow to the pump (for suctioning) 61. The solvent 69A trapped in the chamber 88A is dried in the stage of the head drying process, and after the head drying process has ended, the solvent 69A does not remain in the chamber 88A.

Figure 9:
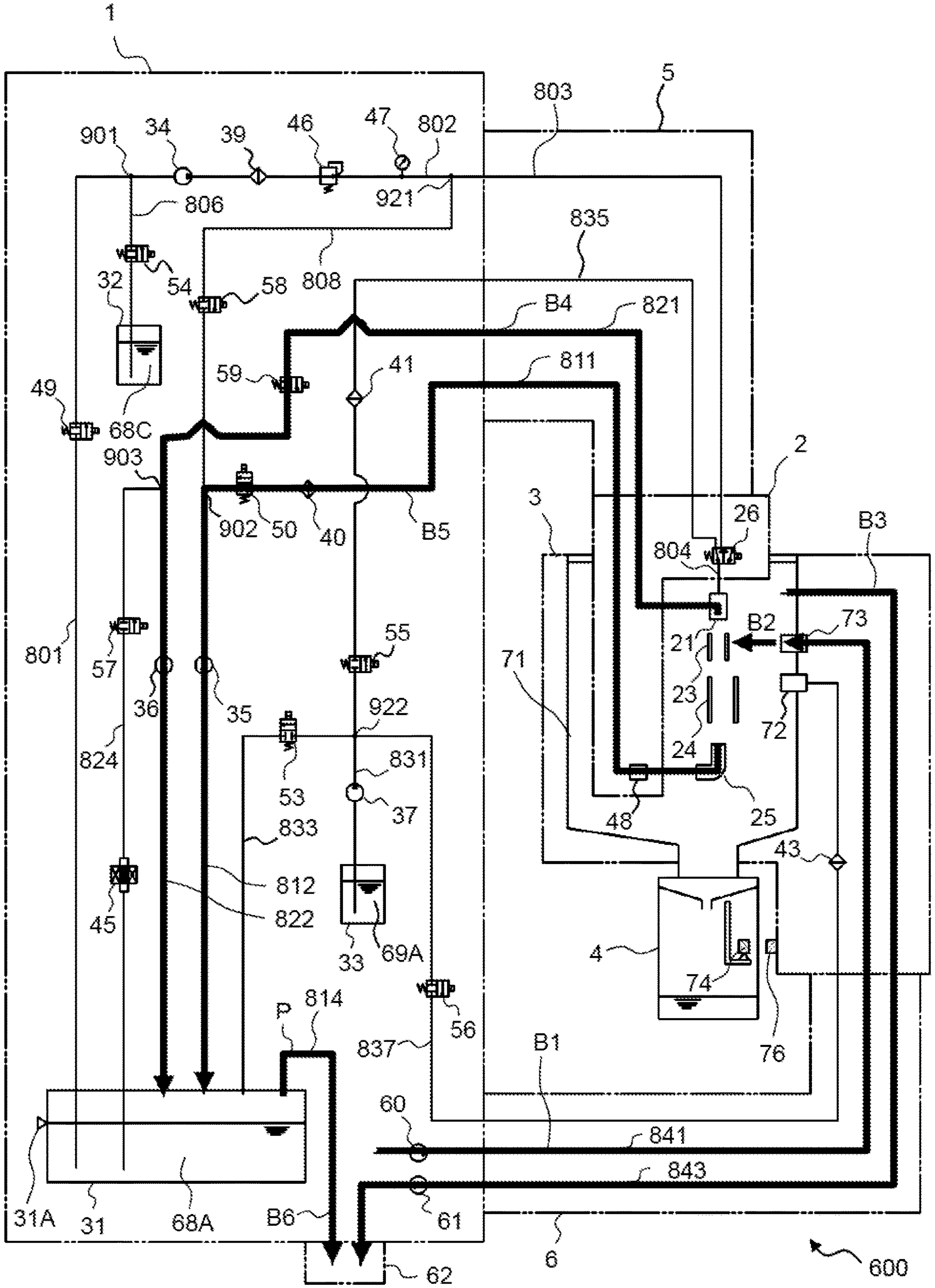
FIG. 9 is a fluid path diagram showing gas flows of the entire device in thick lines when a head drying process of the first embodiment is performed.
Figure 10:
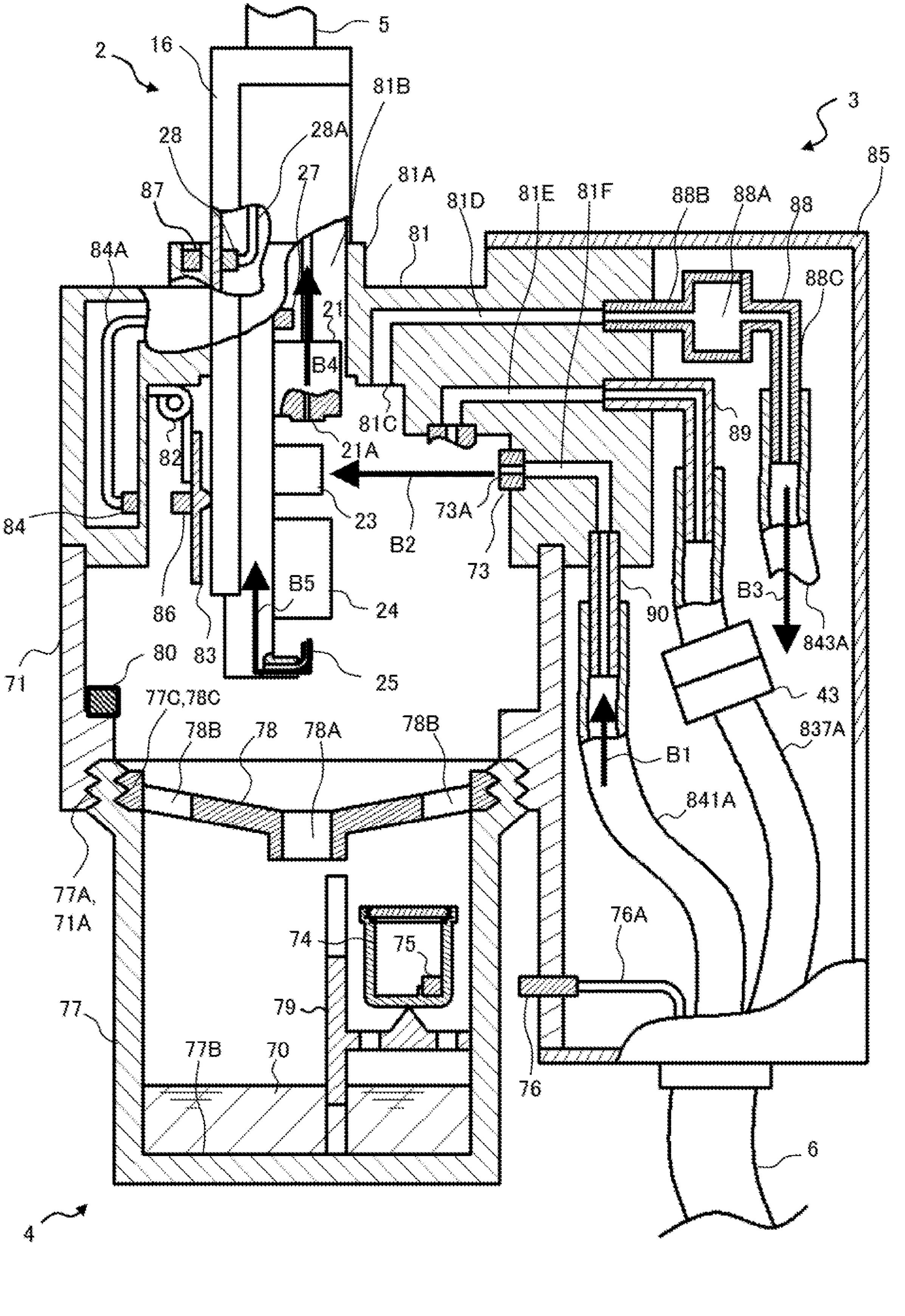
FIG. 10 is a cross-sectional diagram of the head mounting unit showing liquid flows and gas flows inside the head mounting unit in thick lines when the head drying process of the first embodiment is performed.

Next, an operation of the inkjet recording device 600 according to the first embodiment when the head drying process of the print head 2 is executed after the cleaning of the print head will be described with reference to FIGS. 9 and 10. FIG. 9 is a fluid path diagram showing gas flows of the entire device in thick lines (B1 to B6) when the head drying process is performed. FIG. 10 is a cross-sectional diagram of the head mounting unit showing liquid flows and gas flows inside the head mounting unit 3 in thick lines (B1 to B5) when the head drying process is performed.

In FIGS. 9 and 10, the print head 2 is set (mounted) in the head mounting unit 3, and the head drying process is executed after the head cleaning process is completed. In the path 841 for air supply, the pump (for drying) 60 installed in the main body 1 is operated, so that as indicated by a thick line of arrow B1, compressed air is supplied to the air supply nozzle 73 assembled in the cleaning tank 71 of the head mounting unit 3. The air supplied to the air supply nozzle 73 is discharged toward the charging electrode 23 of the print head 2 as indicated by arrow B2. Since the gap between the electrodes of the charging electrode 23 is narrower than a gap of the deflection electrode 24, and is difficult to dry, the air discharge hole 73A formed in the air supply nozzle 73 is set to aim at the gap. In addition, the air discharged from the air supply nozzle 73 dries a component such as the nozzle 21, the charging electrode 23, or the deflection electrode 24 assembled inside the print head 2, or the gutter 25.

In the ink collection paths 811 and 812, the electromagnetic valve (for collection) 50 is energized to open the flow path, and the pump (for collection) 35 is operated, so that as indicated by a thick line of arrow B5, some of the air is suctioned from the gutter 25 and is suctioned and pressure-fed to the ink container 31 of the main body 1. In addition, in the ink circulation paths 821 and 822, the electromagnetic valve (for circulation) 59 is energized to open the flow path, and the pump (for circulation) 36 is operated, so that as indicated by a thick line of arrow B4, some of the air is suctioned from the nozzle 21 and is suctioned and pressure-fed to the ink container 31 of the main body 1. In addition, the air that has flowed into the ink container 31 is discharged from the exhaust path 805 to the outside of the main body 1 as indicated by a thick line of arrow P. In this way, the amount of discharge of solvent gas around the head mounting unit 3 can be reduced by suctioning the air from the gutter 25 and from the nozzle 21 during the head drying process.

In the air suction path (path 841), the pump (for suctioning) 61 is operated, so that as indicated by a thick line of arrow B3, solvent vapor generated in the cleaning tank 71 of the head mounting unit 3 is suctioned from the hole portion 81C and is discharged to the exhaust duct connection portion 62 communicating with the outside of the main body 1. The inkjet recording device 600 is configured such that the solvent vapor discharged from the ink container 31 and the solvent vapor discharged from the head mounting unit 3 are collectively discharged from the exhaust duct connection portion 62. When an air flow rate at which the solvent vapor in the cleaning tank 71 is suctioned from the hole portion 81C by the pump (for suctioning) 61 is higher than an air flow rate at which air is supplied into the cleaning tank 71 from the air supply nozzle 73 by the pump (for drying) 60, the amount of the solvent vapor to be discharged from the head mounting unit 3 can be greatly reduced. Furthermore, when the flow rate of air to be suctioned from the hole portion 81C is high, air flows are generated in the cleaning tank 71, so that an effect of shortening a drying time of a component such as the nozzle 21, the charging electrode 23, the deflection electrode 24 assembled inside the print head 2, or the gutter 25 can be expected.

Figure 11:
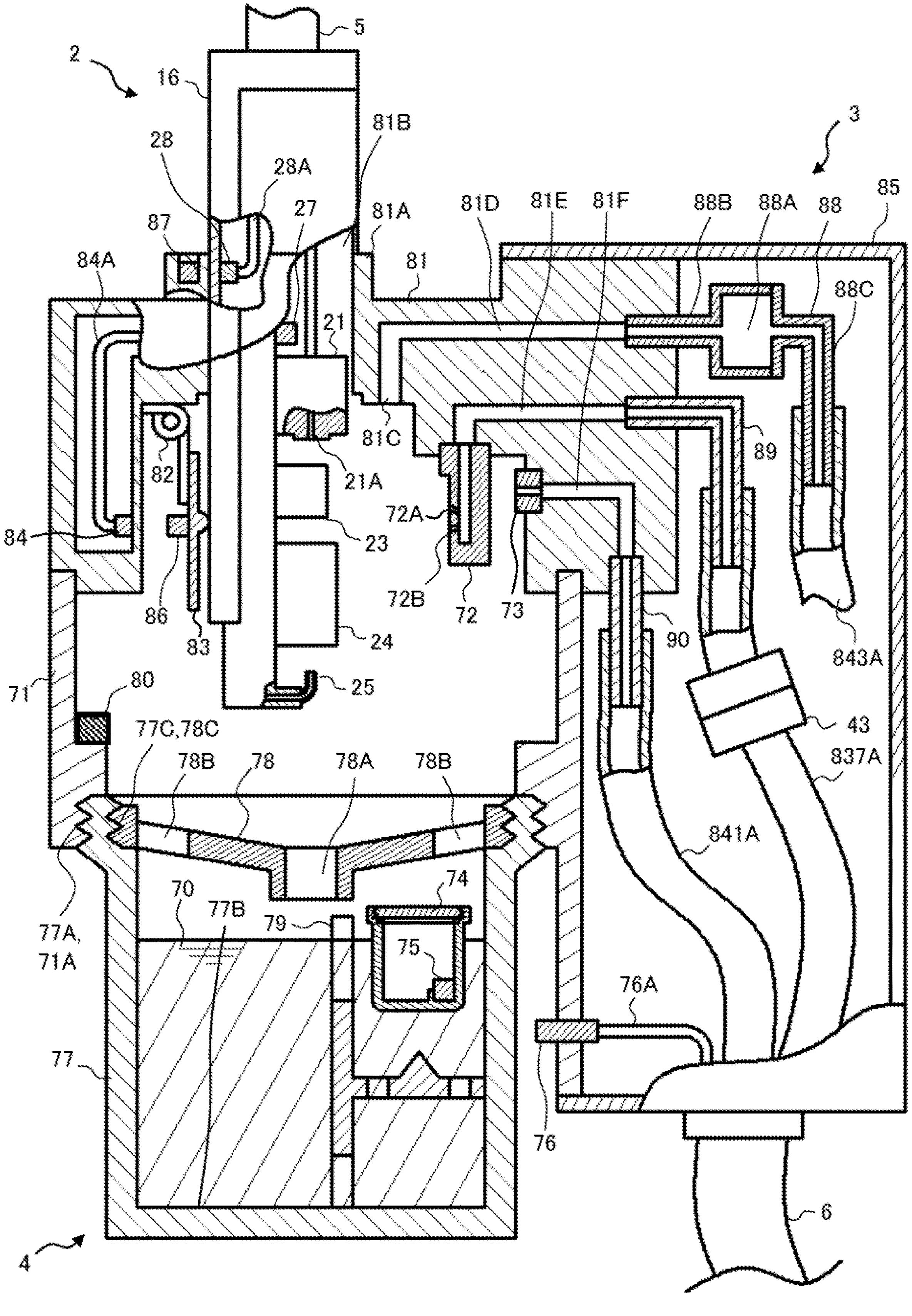
FIG. 11 is a cross-sectional diagram of the head mounting unit showing a state where a large amount of a cleaning liquid is put in the collection container of the first embodiment.

Next, in the inkjet recording device 600 according to the first embodiment, a state where the amount of the liquid contained in the collection container 4 is increased by the repeated execution of the head cleaning process will be described with reference to FIG. 11. FIG. 11 is a cross-sectional diagram of the head mounting unit showing a state where a large amount of the cleaning liquid is put in the collection container of the first embodiment.

When the collection container 4 is almost full with the liquid 70, the state shown in FIG. 11 is obtained. Namely, the float 74 floats up due to the rise of the liquid level in the collection container 4, and the magnetic sensor A 76 cannot output a liquid level detection signal. In this case, the control unit 7 can detect (determine) that the amount of the liquid 70 that can be further contained in the collection container 4 is small, and the collection container 4 is almost full. When the control unit 7 detects such a state, the control unit 7 displays a warning on the operation display unit 8. For example, it may be displayed that the collection container 4 should be removed and the liquid 70 therein should be discharged. Incidentally, a warning has been described as being displayed only on the operation display unit 8, but the worker may be notified through the display portion 20 of the head mounting unit 3, a buzzer, or voice. In addition to display, a warning can also be issued through a buzzer, voice, or the like. With such a warning, as shown in FIG. 5, the worker can remove the collection container 4, and discharge the liquid 70 in the collection container 4. In addition, the empty collection container 4 is attached to the lower portion of the cleaning tank 71 again. Since the magnetic sensor A 76 of a liquid level detection device is installed outside the collection container, work of removing and attaching the collection container 4 is easy.

When the collection container 4 is attached, since the float 74 is at a position where the float 74 can be detected by the magnetic sensor A 76, the magnetic sensor A 76 starts outputting a liquid level detection signal. The control unit 7 receives the liquid level detection signal from the magnetic sensor A 76, and can determine that the collection container 4 is attached. The control unit 7 erases a warning display displayed on the operation display unit 8, based on this determination. Alternatively, control can be performed to display that the head mounting unit 3 is in an operable (cleanable) state, or to release a prohibition state of a head cleaning operation and to permit head cleaning.

In addition, regarding the amount of the liquid 70 in the collection container 4, instead of providing a physical sensor (magnetic sensor A 76 or the like), a solvent usage amount such as "small-amount cleaning: 6 ml", "standard cleaning: 12 ml", or "thorough cleaning: 24 ml" may be determined according to a head cleaning mode, and the control unit 7 may estimate an amount of the liquid 70 in the collection container 4 at the timing when head cleaning is executed, and restrict the head cleaning operation at a necessary timing or instruct disposal of the liquid from the collection container 4.

<Head Cleaning Mode Setting Screen>

Figure 12:
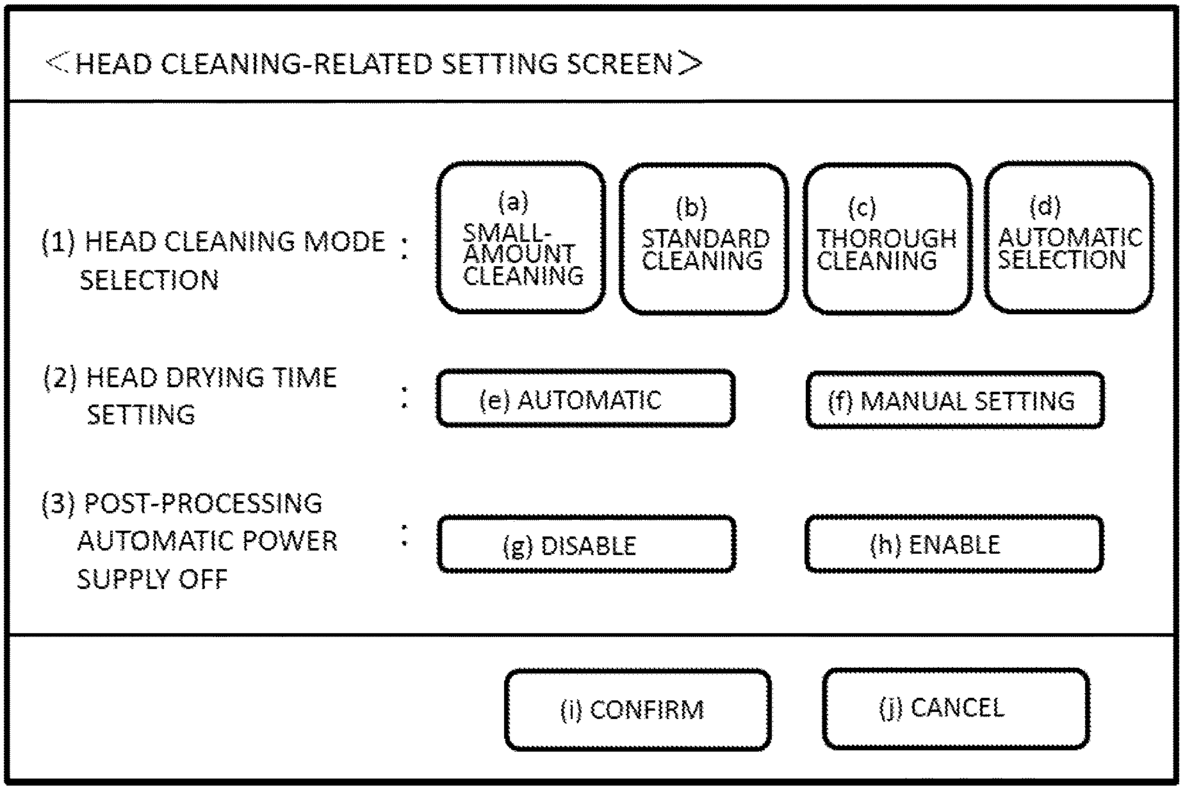
FIG. 12 shows a head cleaning mode selection screen according to the first embodiment.

A head cleaning-related setting screen of the inkjet recording device 600 according to the first embodiment will be described with reference to FIG. 12. Incidentally, a screen of FIG. 12 is displayed on the operation display unit 8.

First, one of "(a) small-amount cleaning, (b) standard cleaning, (c) thorough cleaning, and (d) automatic selection" is selected in a (1) head cleaning mode selection column of the head cleaning-related setting screen. (a) to (c) differ from each other in an amount of the solvent 69A to be used for the head cleaning process, and for example, the solvent usage amounts of (a) to (c) are "(a) small-amount cleaning: 6 ml, (b) standard cleaning: 12 ml, and (c) thorough cleaning: 24 ml", respectively. Incidentally, a solvent usage amount or a control method when "(d) automatic selection" is set will be described later as a second embodiment.

Next, one of "(e) automatic and (f) manual setting" is selected in a (2) head drying time setting column of the head cleaning-related setting screen. When "(e) automatic" is set, the head drying time is set to a value determined in advance based on the type of the solvent 69A or on a value detected by the temperature sensor A 27 or the temperature sensor B 80. In addition, when "(f) manual" is selected, the head drying time can be set between 0 and 10 minutes.

Next, one of "(g) disable and (h) enable" is selected in a (3) post-processing automatic power supply OFF column of the head cleaning-related setting screen. When "(g) disable" is set, a power supply of the inkjet recording device 600 is turned on after the head cleaning process is completed. In addition, when "(f) enable" is selected, the power supply of the inkjet recording device 600 is automatically turned off after the head cleaning process is completed.

In addition, after the settings of (1) to (3) of the head cleaning-related setting screen are briefly completed, one of "(i) confirm and (j) cancel" buttons is pressed. When the "(i) confirm" button is pressed, the displayed settings of (1) to (3) are sent to and overwritten in the control unit 7, and setting items are reflected when head cleaning is executed next. In addition, when the "(j) cancel" button is pressed, the displayed settings of (1) to (3) are not sent to the control unit 7 and are not overwritten. For this reason, when head cleaning is executed next, setting contents (displayed on the screen) when the "(i) confirm" button is previously pressed are continuously used.

<Description of Head Cleaning Operation Flow of First Embodiment>

Figure 13:
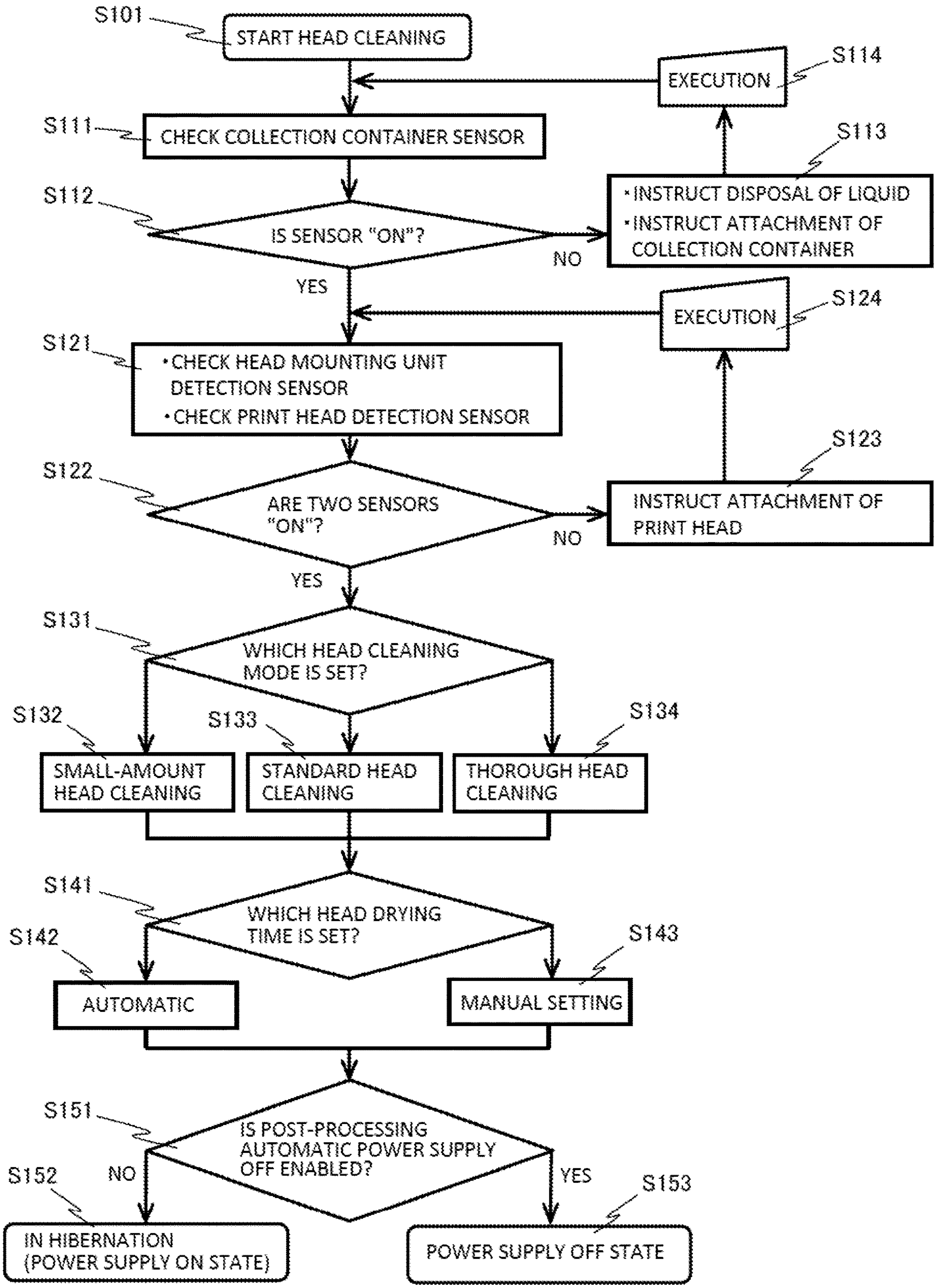
FIG. 13 is a flowchart of the head cleaning process according to the first embodiment.

Next, an operation flow of the head cleaning process of the inkjet recording device 600 according to the present embodiment will be described with reference to FIG. 13. FIG. 13 is a flowchart of the head cleaning process according to the first embodiment.

In FIG. 13, first, in step S101, a start button for performing the head cleaning process displayed on the operation display unit 8 that is a touch panel type is pressed. Alternatively, the start button 18 provided in the head mounting unit 3 is pressed. As a condition to enable the start button for performing the head cleaning process, the inkjet recording device 600 is in a state where the ejection of the ink from the nozzle 21 of the print head 2 is stopped and an ink circulation system component such as the pump (for supply) 34 or the electromagnetic valve (for supply) 49 has no supply of power and is not operated.

In step S111, it is checked whether or not the magnetic sensor A 76 of the head mounting unit 3 is in an "ON" state (detects the magnet A 75 of the collection container 4).

In step S112, if the check result of step S111 is that the magnetic sensor A 76 is in an "ON" state, the determination is "YES" (the collection container 4 is set (mounted) in the head mounting unit 3), and the process proceeds to step S121. If the check result of step S111 is that the magnetic sensor A 76 is in an "OFF" state, in step S112, the determination is "NO" (the collection container 4 is not set (mounted) in the head mounting unit 3 or the liquid 70A is stored in the collection container 4 and the float 74 is in a floating state), and the process proceeds to step S113.

In step 113, contents such as "Please discharge the liquid 70A in the collection container 4 to empty the collection container 4. Please set the empty collection container 4 in the head mounting unit" are displayed on the operation display unit 8 of the main body 1 or on the display portion 20 of the head mounting unit 3.

In step S114, the worker sets the empty collection container 4 in the head mounting unit 3. Thereafter, the worker presses the start button of the operation display unit 8 of the main body 1 or the start button 18 of the head mounting unit 3 to execute the process of step S111 again.

In step S121, it is checked whether or not the magnetic sensor B 84 of the head mounting unit 3 is in an "ON" state (detects the Magnet B 86 assembled to the lid member 83), and it is checked whether or not the magnetic sensor C 28 of the print head 2 is in an "ON" state (detects the magnet C 87 assembled to the cleaning block 81).

In step S122, if the check result of step S121 is that the magnetic sensor B 84 is in an "ON" state and the magnetic sensor C 28 is in an "ON" state, the determination is "YES" (the print head 2 is set (mounted) in the head mounting unit 3), and the process proceeds to step S131. If the check result of step S121 is that one of the magnetic sensor B 84 and the magnetic sensor C 28 are in an "OFF" state, the determination is "NO" (the print head 2 is not set (mounted) in the head mounting unit 3), and the process proceeds to step S123.

In step 123, a content such as "Please set the print head in the head mounting unit" is displayed on the operation display unit 8 of the main body 1 or on the display portion 20 of the head mounting unit 3. In step S124, the worker sets the print head 2 in the head mounting unit 3. Thereafter, the worker presses the start button of the operation display unit 8 of the main body 1 or the start button 18 of the head mounting unit 3 to execute the process of step S121 again.

In step S131, if the content set in advance in the (1) head cleaning mode selection column of the head cleaning-related setting screen shown in FIG. 12 is "(a) small-amount cleaning", the process proceeds to step S132, if the content is "(b) standard cleaning", the process proceeds to step S133, and if the content is "(c) thorough cleaning", the process proceeds to step S134.

Steps S132 to S134 are head cleaning steps, and the head cleaning process (cleaning the print head 2 by ejecting the solvent 69B from the cleaning nozzle 72 of the head mounting unit 3) determined by each of the head cleaning modes "(a) small-amount cleaning, (b) standard cleaning, (c) thorough cleaning, and (d) automatic selection" is executed. In addition, when the head cleaning process is completed, the process proceeds to step S141 in any case.

In step S141, if the content set in advance in the (2) head drying time setting column of the head cleaning-related setting screen shown in FIG. 12 is "(e) automatic", the process proceeds to step S142, and if the content is "(f) manual setting", the process proceeds to step S143.

Step S142 is a head drying step, and the head drying process (drying the print head 2 by ejecting air from the air supply nozzle 73 of the head mounting unit 3, and by suctioning solvent vapor from the hole portion 81C in the cleaning tank 71) is executed during a time determined in advance based on the type of the solvent 69A and on a value detected by the temperature sensor A 27 or the temperature sensor B 80.

Step S143 is a head drying step, and the head drying process (drying the print head 2 by ejecting air from the air supply nozzle 73 of the head mounting unit 3, and by suctioning solvent vapor from the hole portion 81C in the cleaning tank 71) is executed during a head drying time (set between 0 and 10 minutes) entered in "(f) manual setting".

In step S151, if the content set in advance in the post-processing automatic power supply OFF of the head cleaning-related setting screen shown in FIG. 12 is "(g) disable", the process proceeds to step S152, and if the content is "(h) enable", the process proceeds to step S153.

In step S152, the inkjet recording device 600 is in a state where the ejection of the ink from the nozzle 21 of the print head 2 is stopped and an ink circulation system component such as the pump (for supply) 34 or the electromagnetic valve (for supply) 49 has no supply of power and is not operated. In this state, the head cleaning operation flow ends.

In step S153, after the head drying step is completed, the power supply of the inkjet recording device 600 is set to OFF, and the head cleaning operation flow ends.

<Effects of First Embodiment>

As described above, according to the first embodiment of the present invention, when the print head 2 is cleaned, the amount of solvent vapor released around the print head 2 can be reduced, so that the smell of solvent vapor felt by the worker during cleaning of the print head 2 can be reduced.

In addition, according to the first embodiment of the present invention, whether or not head cleaning can be executed can be determined by detecting that the print head 2 or the collection container 4 is set in the head mounting unit 3, so that it is possible to provide the inkjet recording device 600 capable of preventing erroneous work.

Second Embodiment

Figure 14A:
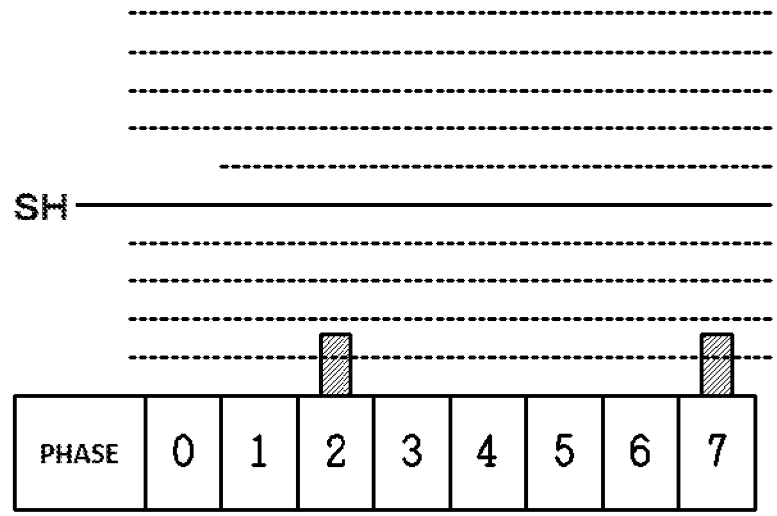
FIGS. 14A and 14B are diagrams showing a method for determining ink stains during a head cleaning process and a method for determining a dry state in a head drying process according to a second embodiment.
Figure 14B:
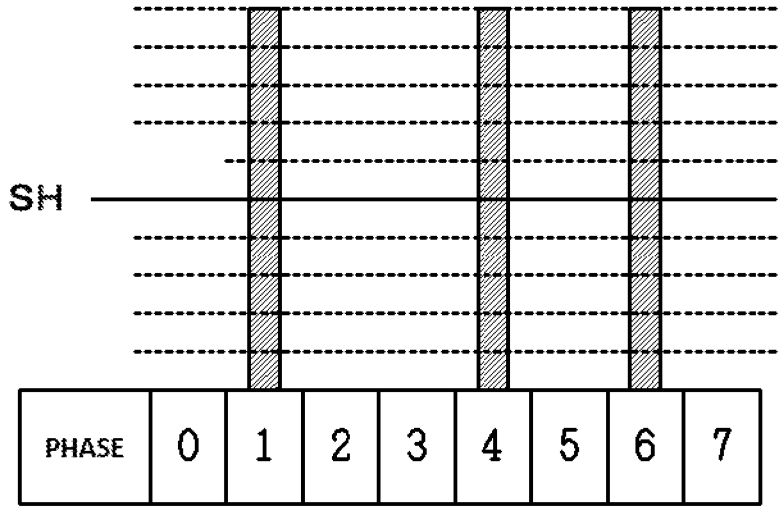
Figure 15:
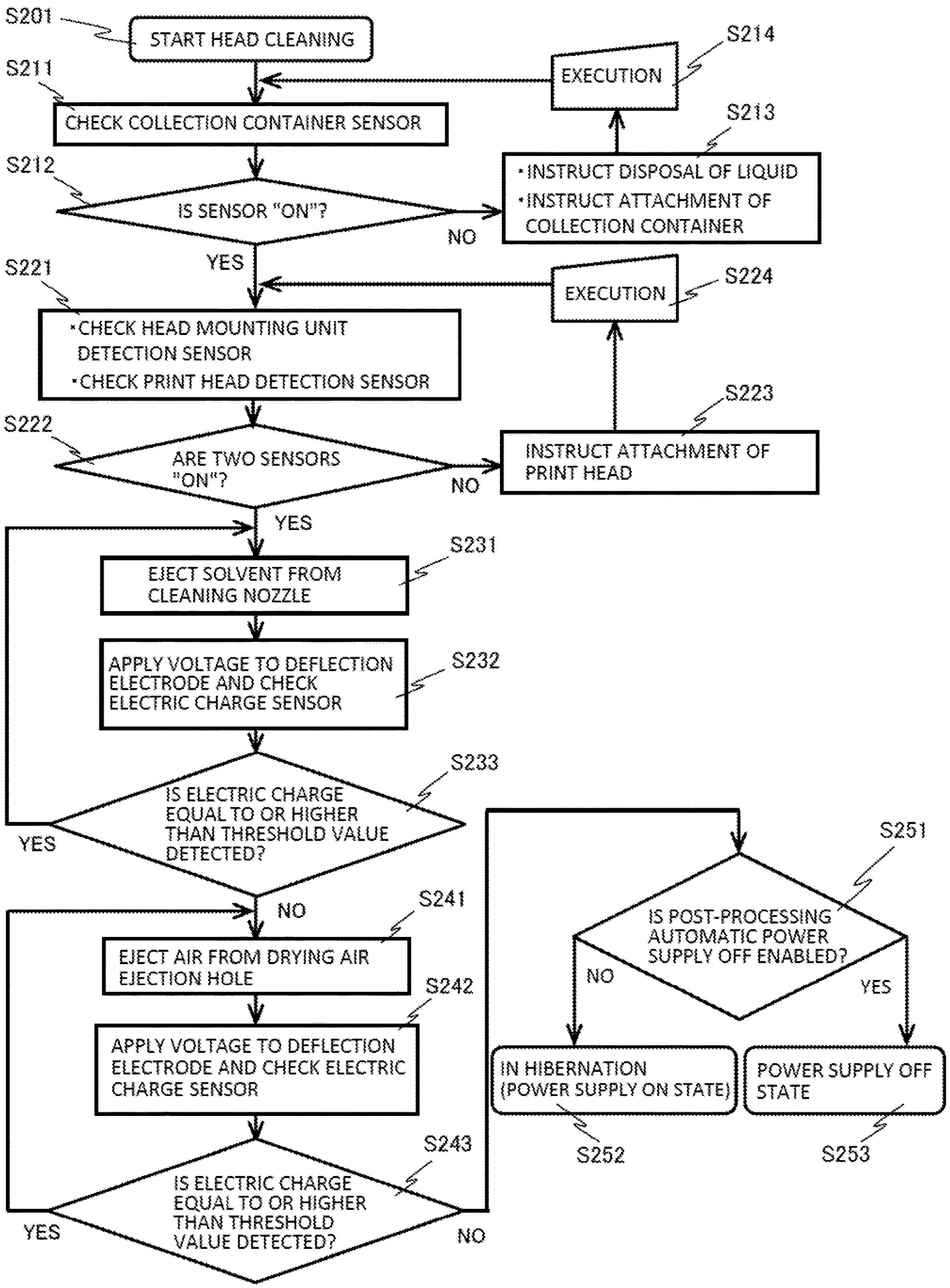
FIG. 15 is a flowchart of the head cleaning process according to the second embodiment.

Next, the inkjet recording device 600 according to a second embodiment of the present invention will be described. The second embodiment also adopts the same configurations as those of FIGS. 1 to 11 described in the first embodiment. In addition, a method for detecting clean and dry states according to the second embodiment is shown in FIGS. 14A and 14B, and an operation flow according to the second embodiment is shown in FIG. 15. Since FIGS. 1 to 11 have already been described, the description thereof will be omitted. In addition, portions different from the first embodiment will be mainly described with reference to FIGS. 14 and 15.

<Determination of Head Clean and Dry States of Second Embodiment>

First, a method for determining ink stains in a head cleaning process will be described with reference to FIGS. 14A and 14B.

In the inkjet recording device 600 according to the second embodiment, in a state where the print head 2 is set (mounted) in the head mounting unit 3, by the method described with reference to FIGS. 7 and 8 in the first embodiment, a small amount (for example, 1 to 5 ml) of the solvent 69A is ejected from the cleaning nozzle 72 to wet components assembled to the print head 2 (the nozzle 21, the charging electrode 23, the deflection electrode 24, the gutter 25, and the like). In a state where the print head 2 is wetted, a voltage (for example, 1 to 7 kV) is applied to the deflection electrode 24 using the deflection voltage generation circuit 332.

The solvent 69A used in the inkjet recording device 600 is a non-conductive liquid, but the ink 68A is a conductive liquid in which a conductive substance is mixed with a material. The ink 68A that has adhered to the print head 2 is not conductive in a dry state, but becomes a conductive liquid when wetted with the solvent 69A. Therefore, in a state where the print head 2 is stained with the ink 68A, when the print head 2 is wetted with the solvent 69A, and a voltage is applied to cause a current to flow through the deflection electrode 24, the electric charge sensor 48 assembled to the print head 2 can detect the current.

FIGS. 14A and 14B are diagrams showing voltages detected by the electric charge sensor 48, the horizontal axis indicates a specified elapsed time (phase), and the vertical axis indicates magnitudes of the detected voltages. Whether or not stains on the print head 2 caused by the ink 68A are allowable is determined by the number of voltages higher than a threshold level SH in a specified elapsed time. In the present embodiment, when the number of voltages higher than the threshold level SH in a specified elapsed time is 0 (the case of FIG. 14A), it is determined that there is no stain. When the number of voltages is 1 or more (the case of FIG. 14B), it is determined that there are stains. When it is determined that there are stains, head cleaning (ejection of the solvent 69 from the cleaning nozzle 72) is additionally executed. In addition, when the number of voltages higher than the threshold level SH in a specified elapsed time is 0, it is determined that the amount of the ink 68A that has adhered to the print head 2 is small and allowable, and additional head cleaning is not executed.

Next, a method for determining a dry state of the print head 2 in a head drying process will be described with reference to FIGS. 14A and 14B.

In the inkjet recording device 600 according to the second embodiment, in a state where the print head 2 is set (mounted) in the head mounting unit 3, by the method described with reference to FIGS. 9 and 10 in the first embodiment, air is ejected from the air supply nozzle 73 to dry the solvent 69A that has adhered to components assembled to the print head 2 (the nozzle 21, the charging electrode 23, the deflection electrode 24, the gutter 25, and the like). In a case where humidity around the head mounting unit 3 is high when the solvent 69A is dried, there is a possibility that water droplets adhere to the print head 2 due to vaporization heat of the solvent 69A. Therefore, in a state where the print head 2 is wetted, a voltage (for example, 1 to 7 kV) is applied to the deflection electrode 24 using the deflection voltage generation circuit 332. When a current flows through the deflection electrode 24 due to the application of a voltage, the electric charge sensor 48 assembled to the print head 2 can detect the current.

Similarly to a determination of a state of ink stains, a determination of a dry state of the print head 2 is performed using the electric charge sensor 48, and details of the determination will be described with reference to FIGS. 14A and 14B. Whether or not a dry state of the print head 2 is allowable is determined by the number of voltages higher than the threshold level SH in a specified elapsed time. In the present embodiment, when the number of voltages higher than the threshold level SH in a specified elapsed time is 1 or more (state of FIG. 14B), it is determined that drying is insufficient, and head drying (the print head 2 is dried by ejecting air from the air supply nozzle 73 of the head mounting unit 3, and by suctioning solvent vapor from the hole portion 81C in the cleaning tank 71) is additionally executed. In addition, when the number of voltages higher than the threshold level SH in a specified elapsed time is 0 (the case of FIG. 14A), it is determined that the print head 2 is dried to the point where a problem does not occur, and an additional head drying process is not executed.

<Description of Head Cleaning Operation Flow of Second Embodiment>

Next, an operation flow of the head cleaning process of the inkjet recording device 700 according to the second embodiment will be described with reference to FIG. 15. FIG. 15 is a flowchart of the head cleaning process according to the second embodiment.

In FIG. 15, "step S201, steps S211 to S214, and steps S221 to S224" are the same as "step S101, steps S111 to S114, and steps S121 to S124" described with respect to FIG. 13 in the first embodiment. For this reason, a description of "step S201, steps S211 to S214, and steps S221 to S224" will be omitted.

Step S231 is a head cleaning step, and is operated when "(d) automatic selection" is set in the (1) head cleaning mode selection column of the head cleaning-related setting screen shown in FIG. 12. In the head mounting unit 3, a process in which a small amount (for example, 5 to 10 ml) of the solvent 69A is ejected from the cleaning nozzle 72 to clean the print head 2 (head cleaning process) is executed.

In step S232, a voltage is applied to the deflection electrode 24, and it is checked whether or not the electric charge sensor 48 detects a voltage higher than the threshold level SH. A case where the voltage is higher than the threshold level SH and a case where the voltage is not higher than the threshold level SH are binarized and determined as "1" and "0", respectively.

In step S233, if the number of times that binarized values in step S232 are determined to be "1" within a certain period of time is 0, it is determined that ink stains on the print head 2 are removed to an allowable value, and the process proceeds to step S241. If the number of times that binarized values are determined to be "1" is 1 or more, it is determined that ink stains on the print head 2 are removed to the allowable value, and step S231 is executed again.

Step S241 is a head drying step, and is operated when "(d) automatic" is set in the (2) head drying time setting column of the head cleaning-related setting screen shown in FIG. 12. In the head mounting unit 3, the head drying process (drying the print head 2 by ejecting air from the air supply nozzle 73 of the head mounting unit 3, and by suctioning solvent vapor from the hole portion 81C in the cleaning tank 71) is executed during a time determined in advance based on the type of the solvent 69A and on a value detected by the temperature sensor A 27 or the temperature sensor B 80.

In step S242, a voltage is applied to the deflection electrode 24, and it is checked whether or not the electric charge sensor 48 detects a voltage higher than the threshold level SH. A case where the voltage is higher than the threshold level SH and a case where the voltage is not higher than the threshold level SH are binarized and determined as "1" and "0", respectively.

In step S243, if the number of times that binarized values in step S242 are determined to be "1" within a certain period of time is 0, it is determined that the print head 2 is dried to an allowable value, and the process proceeds to step S251. If the number of times that binarized values are determined to be "1" is 1 or more, it is determined that the print head 2 is dried to the allowable value, and step S241 is executed again. Incidentally, in step S241 again, for example, air may be continuously ejected from the air supply nozzle 73 in a state where a deflection voltage is applied, and the process may proceed to step S251 when the binarized values are not determined to be "1" within the determined time.

In FIG. 15, since "steps S251 to S253" are the same as "steps S151 to S153" described with respect to FIG. 13 in the first embodiment, a description thereof will be omitted.

<Effects of Second Embodiment>

As described above, according to the second embodiment of the present invention, it is possible to provide the inkjet recording device 600 capable of automatically determining the amount of stains of the ink 68A on the print head 2 by means of a small amount of usage of the solvent 69A, and executing head cleaning until it is automatically determined that ink stains on the print head 2 are removed, by setting the print head 2 in the head mounting unit 3.

In addition, according to the second embodiment of the present invention, it is possible to provide the inkjet recording device 600 capable of automatically determining a dry state of the print head 2, and executing head drying until it is automatically determined that the print head 2 is dried, in a state where the print head 2 is set in the head mounting unit.

Third Embodiment

Next, the inkjet recording device 600 according to a third embodiment of the present invention will be described. The second embodiment also adopts the same configurations as those of FIGS. 1 to 11 described in the first embodiment. Therefore, a description of FIGS. 1 to 11 will be omitted. Hereinafter, an operation flow of the third embodiment will be mainly described.

<Description of Stop Process Operation Flow of Third Embodiment>

Figure 16:
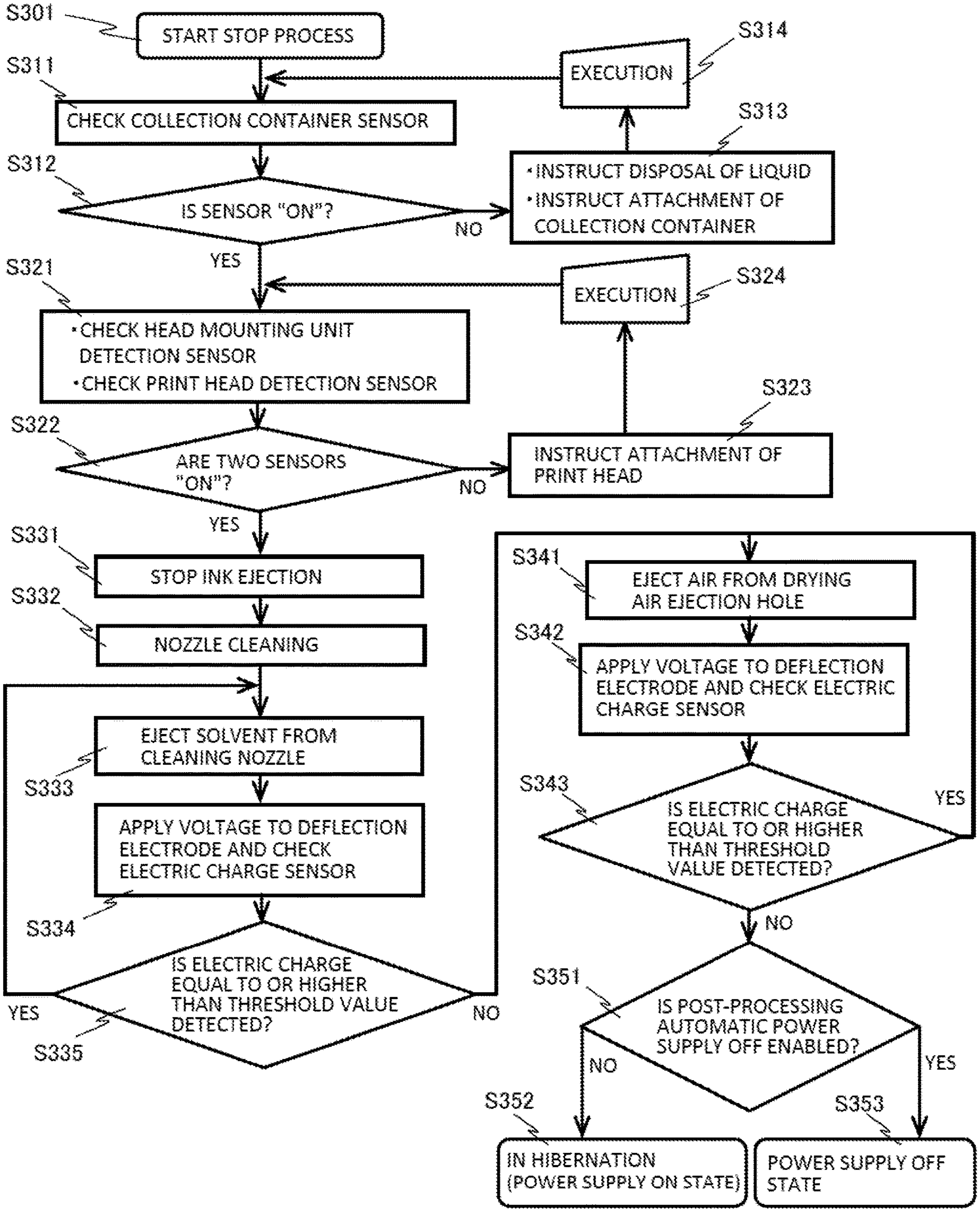
FIG. 16 is a flowchart of an operation stop process according to a third embodiment.

Next, an operation flow of an operation stop process of the inkjet recording device 600 according to the present embodiment will be described with reference to FIG. 16. FIG. 16 is a flowchart of the operation stop process according to the third embodiment.

In FIG. 16, first, in step S301, a start button for performing the operation stop process displayed on the operation display unit 8 that is a touch panel type is pressed. Alternatively, the start button 18 provided in the head mounting unit 3 is pressed. As a condition to enable the start button for performing the operation stop process, the inkjet recording device 600 is in a state where power is supplied to an ink circulation system component such as the pump (for supply) 34 or the electromagnetic valve (for supply) 49 and the ink is ejected from the nozzle 21 of the print head 2.

In FIG. 16, "steps S311 to S314 and steps S321 to S324" are the same as "step S101, steps S111 to S114, and steps S121 to S124" described with respect to FIG. 13 in the first embodiment. For this reason, a description of "step S311 to S314 and steps S321 to S324" will be omitted.

Step S331 is an ink ejection stop step, and a process of stopping the ejection of the ink 68A from the nozzle 21 of the print head 2 is performed.

Step S332 is a nozzle cleaning step, and the solvent 69A is supplied to the nozzle 21 of the print head 2 via the switching valve 26 to perform cleaning from the inside of the nozzle 21.

In FIG. 16, "steps S333 to S335 and steps S341 to S343" are the same operations as "step S231 to S233 and steps S241 to S243" described with respect to FIG. 15 in the second embodiment. For this reason, a description of "step S333 to S335 and steps S341 to S343" will be omitted.

In FIG. 16, "steps S351 to S353" are the same operations as "steps S151 to S153" described with reference to FIG. 13 in the first embodiment. For this reason, a description of "step S351 to S353" will be omitted.

<Effects of Third Embodiment>

As described above, according to the third embodiment of the present invention, it is possible to provide the inkjet recording device 600 capable of automatically executing a series of flows of an ink ejection stop process (process of stopping the ejection of the ink 68A from the nozzle 21), a nozzle cleaning process (process of cleaning the insides of the paths by ejecting the solvent 69A from the nozzle 21), and the head cleaning process (process of cleaning the print head 2 from the outside by ejecting the solvent 69A from the cleaning nozzle 72) by setting the print head 2 in the head mounting unit 3 during operation (the ink 68A is ejected from the nozzle 21).

Fourth Embodiment

Next, the inkjet recording device 600 according to a fourth embodiment of the present invention will be described. The fourth embodiment also adopts the same configurations as those of FIGS. 1 to 11 described in the first embodiment. Therefore, a description of FIGS. 1 to 11 will be omitted. The fourth embodiment will be mainly described with reference to FIGS. 17 to 20.

<Phase Search Method of Fourth Embodiment>

A phase search method for the inkjet recording device 600 in the present embodiment will be described. FIGS. 17A to 17C are timing charts showing a phase relationship between excitation signal and phase search charging voltage. FIG. 17A shows an excitation signal that is a reference for atomizing, as an example of detecting a charging voltage application timing. FIG. 17B is an enlarged diagram of one cycle of the excitation signal. FIG. 17C shows a charging waveform in each phase when one cycle of the excitation signal is divided into eight segments and a charging signal for half cycle starting each phase is applied.

In the inkjet recording device 600, in order to detect an optimal charging voltage application timing, in a state where printing is not performed (during an interval between printing and printing or the like), an electric charge amount of very small charging electric charge 68B2 in each phase is detected by offsetting a charging phase with respect to an excitation signal that is a reference for atomizing, and by applying a charging voltage to the ink particles 68B1 so as not to fly over the gutter 25. Namely, phase search is performed by generating phase search charging voltages.

In order to generate phase search charging voltages for the phase search, the phase search charging signal generation circuit 341 (refer to FIG. 3) generates charging signals for generating a plurality of types of phase search charging voltages with phases changed with respect to an excitation voltage. The phase search charging voltages are set to magnitudes such that the ink particles 68B1 charged with the charging voltage are deflected to the extent that the ink particles 68B1 do not fly over the gutter 25 (can be captured by the gutter 25), and phase detection signals output from the electric charge sensor 48 according to the charging amount of the very small charging electric charge 68B2 of the ink particles 68B1 charged with the charging voltage are input to the phase determination circuit 351 and to the A/D converter 352 via the amplification circuit 353.

Figure 18A:
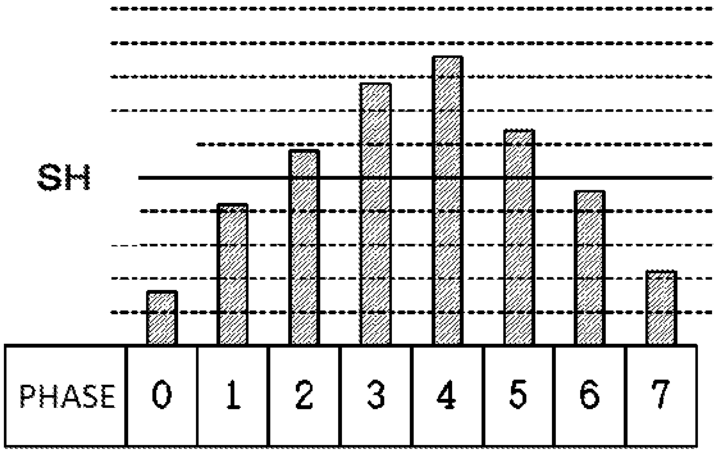
FIGS. 18A to 18C are diagrams showing a method for determining the presence or absence of an abnormality at the start of operation according to the fourth embodiment.
Figure 18B:
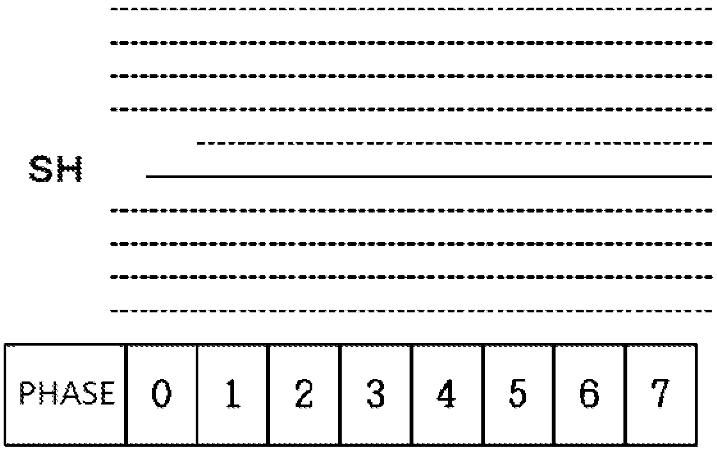
Figure 18C:
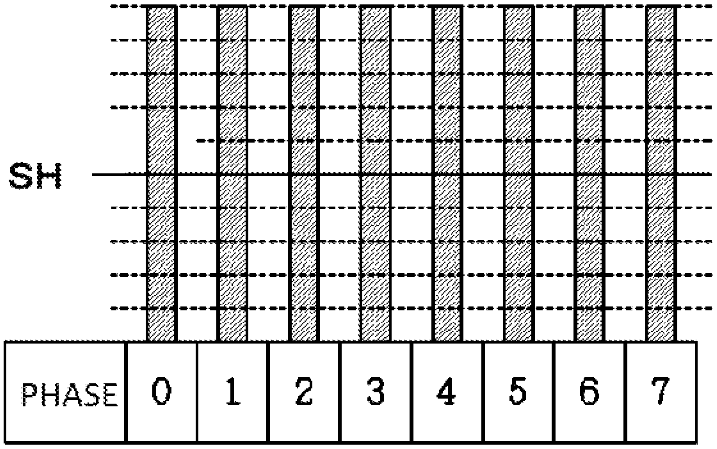

Waveforms of phase detection signals output from the amplification circuit 353 change, for example, as shown in FIGS. 18A to 18C. When the inkjet recording device 600 is in a normal state, as shown in FIG. 18A, the waveform of the phase detection signal changes with a change in the generation phase of the phase search charging voltage.

The phase determination circuit 351 receives such a phase detection signal, and compares the input phase detection signal of each phase with the threshold level SH to binarize the input phase detection signal, and the phase detection signal higher than the threshold level SH and the phase detection signal not higher than the threshold level SH are determined to be "1" and "0", respectively, and are input to the MPU 301. The MPU 301 determines that a phase in which the binarized phase detection signal changes from "$_0$" to "1" is a phase optimal for generating a charging voltage for charging the ink particles 68B, and generates a print charging signal so as to generate a subsequent print charging voltage in the phase.

In addition, when the inkjet recording device 600 is in an abnormal state, the waveform of the phase detection signal is in the state shown in FIG. 18B or 18C.

FIG. 18B shows a state where there is no single occasion where phase detection signal is higher than the threshold level and is determined to be "1" For example, the ink particles 68B ejected from the nozzle 21 may be offset from a direction in which the ink particles 68B originally should fly, and may be scattered without being collectable by the gutter 25 (such a phenomenon is referred to as beam bending). In such a state, the electric charge sensor 48 cannot detect the charging signal for the ink particles 68B1, and the waveform of the phase detection signal shown in FIG. 18B is obtained.

FIG. 18C shows a state where all (eight) signals are higher than the threshold level and are determined to be "1". For example, when a deflection voltage (1 to 7 kV) is applied to the deflection electrode 24 in a state where the print head 2 is stained with the ink 68A, the voltage leaks. In addition, the electric charge sensor 48 detects a voltage different from the voltage applied to the ink particles 68B1, as noise, and the waveform of the phase detection signal shown in FIG. 18C is obtained.

<Screen Configuration of Fourth Embodiment>

Figure 19:
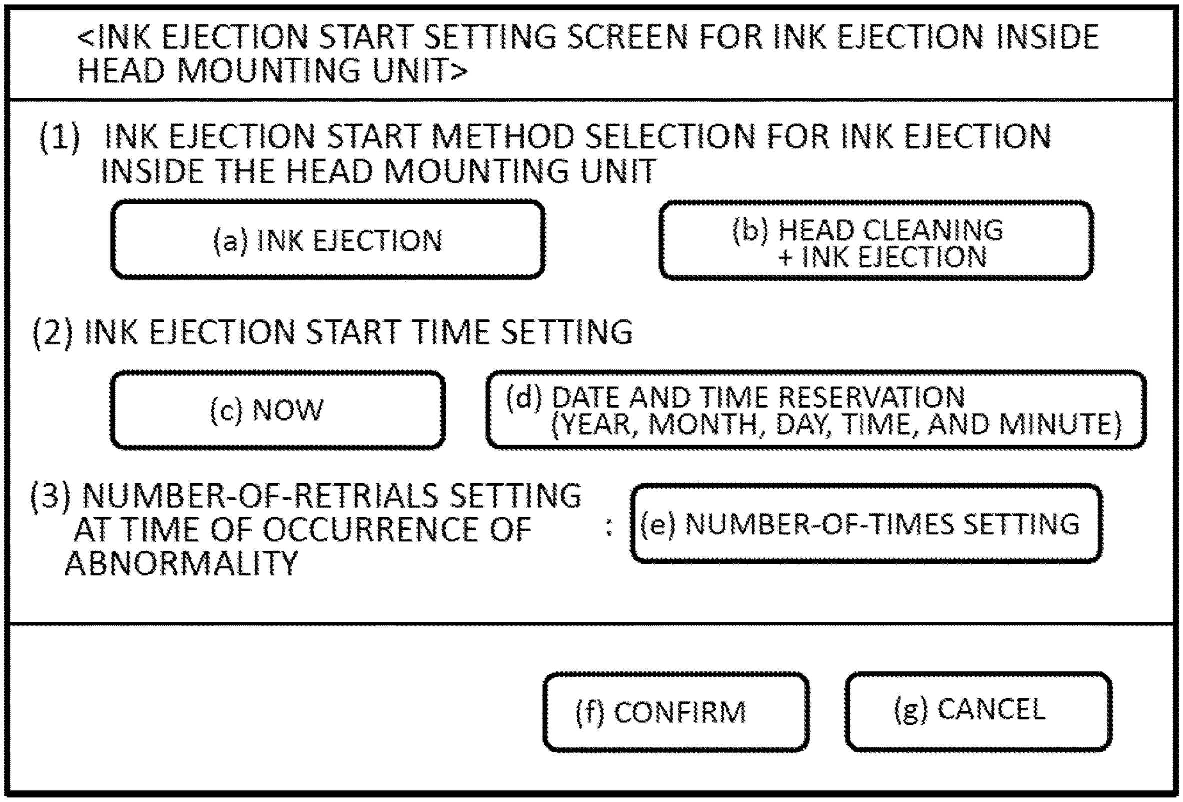
FIG. 19 shows an operation start mode selection screen according to the fourth embodiment.

An ink ejection start setting screen for ink ejection inside the head mounting unit 3 of the inkjet recording device 600 according to the fourth embodiment will be described with reference to FIG. 19. Incidentally, the screen of FIG. 19 is displayed on the operation display unit 8.

First, one of "(a) ink ejection and (b) head cleaning+ink ejection" is selected in an "(1) ink ejection start method selection column for ink ejection inside the head mounting unit" of the ink ejection start setting screen for ink ejection inside the head mounting unit 3. When "(a) ink ejection" is set, a head cleaning process is not executed, and only an ink ejection process is executed. In addition, when "(b) head cleaning+ink ejection" is selected, the ink ejection process is executed after the head cleaning process is executed.

Next, one of "(c) now and (d) date and time reservation" is selected in an "(2) ink ejection start time setting column" of the ink ejection start setting screen for ink ejection inside the head mounting unit 3. In a case where "(c) now" is set, when an "(f) determination" button is pressed, an ink ejection start process immediately starts inside the head mounting unit. In addition, when "(d) date and time reservation" is selected, "year, month, day, hour, and minute" at which ink ejection inside the head mounting unit wants to be started can be set.

Next, the number of times can be set in a range of 0 to 5 times for "(e) number-of-times setting" in a "(3) number-of-retrials setting column at time of occurrence of abnormality" of the ink ejection start setting screen for ink ejection inside the head mounting unit.

In addition, after the settings of (1) to (3) of the ink ejection start setting screen for ink ejection inside the head mounting unit are briefly completed, one of "(f) determination and (g) cancel" buttons is pressed. When the "(f) determination" button is pressed, the displayed settings of (1) to (3) are overwritten in the control unit 7, and setting items are reflected when ink ejection inside the head mounting unit is started next. In addition, when the "(g) cancel" button is pressed, the displayed settings of (1) to (3) are not overwritten in the control unit 7, and when ink ejection inside the head mounting unit is started next, setting contents (displayed on the screen) when the "(f) determination" button is previously pressed are continuously used.

<Description of Operation Start Flow of Fourth Embodiment>

Figure 20:
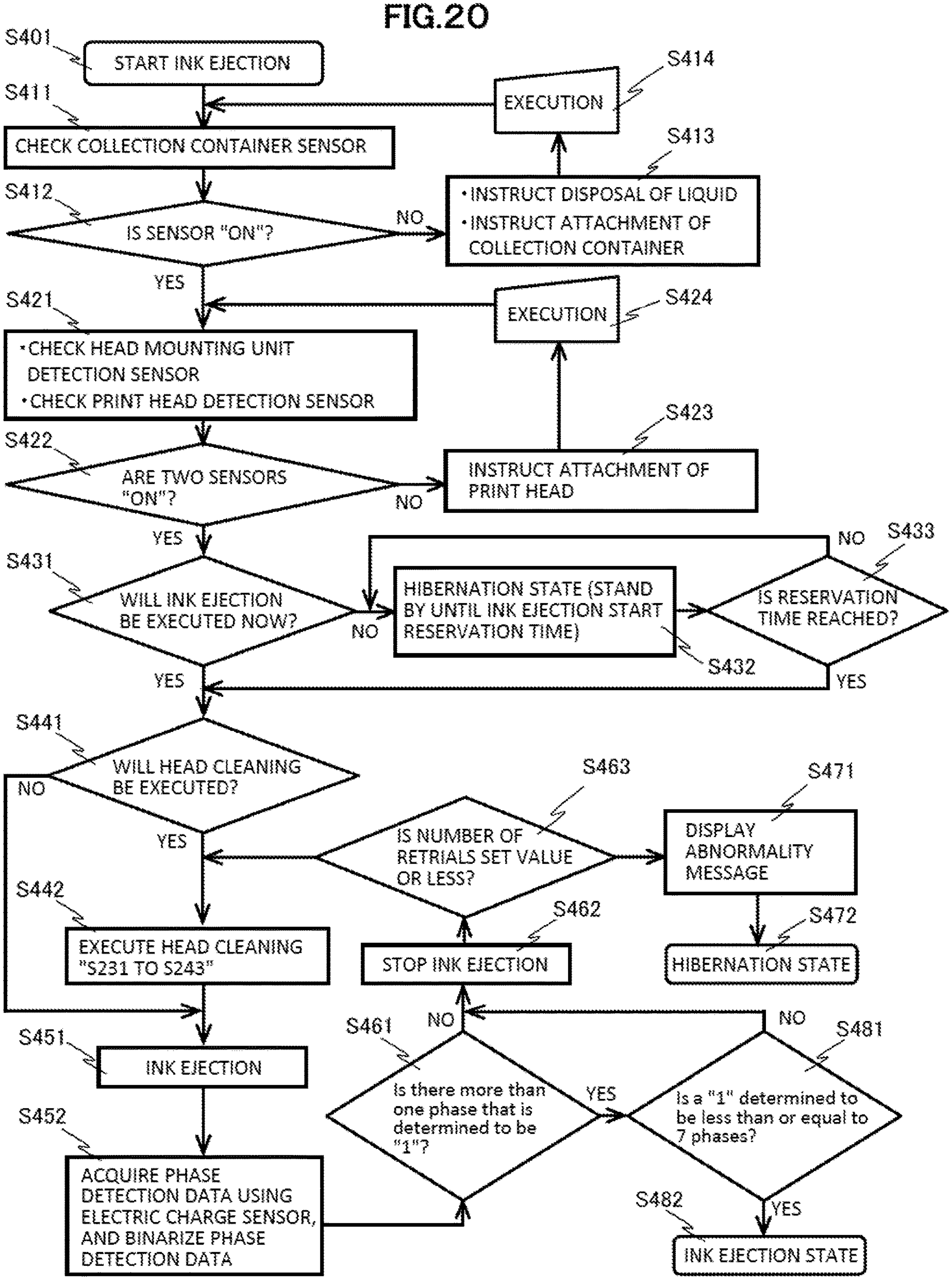
FIG. 20 is a flowchart of an operation start process according to the fourth embodiment.

Next, an operation flow of an operation start (ink ejection start) process of the inkjet recording device 600 according to the present embodiment will be described with reference to FIG. 20. FIG. 20 is a flowchart of the operation start process according to the fourth embodiment.

In FIG. 20, first, in step S401, a start button for performing the operation start (ink ejection start) process displayed on the operation display unit 8 is pressed. Alternatively, the start button 18 provided in the head mounting unit 3 is pressed. As a condition to enable the start button for performing the operation start (ink ejection start) process, the inkjet recording device 600 is in a state where the ejection of the ink from the nozzle 21 of the print head 2 is stopped and an ink circulation system component such as the pump (for supply) 34 or the electromagnetic valve (for supply) 49 has no supply of power and is not operated.

In FIG. 20, "steps S411 to S414 and steps S421 to S424" are the same operations as "step S111 to S114 and steps S121 to S124" described with respect to FIG. 13 in the first embodiment. For this reason, a description of "step S411 to S414 and steps S421 to S424" will be omitted.

In step S431, if the content set in the "(2) ink ejection start time setting column" of the ink ejection start setting screen for ink ejection inside the head mounting unit shown in FIG. 19 is "(c) now", the process proceeds to step S441, and if the content is "(d) date and time reservation", a date and time at which ink ejection is started next is set, and the process proceed to step S432.

In step S432, the inkjet recording device 600 is in a hibernation state (state where the ejection of the ink from the nozzle 21 of the print head 2 is stopped and an ink circulation system component such as the pump (for supply) 34 or the electromagnetic valve (for supply) 49 has no supply of power and is not operated), and stands by until the date and time set in step S431 is reached.

In step S433, it is checked whether or not the date and time set in step S431 is reached, and if the set reservation time is reached, the determination is "YES", and the process proceeds to step S441. If the set reservation time is not reached, the determination is "NO", and step S432 is executed again.

In step S441, if the content set in the "(1) ink ejection start method selection column for ink ejection inside the head mounting unit" of the ink ejection start setting screen for ink ejection inside the head mounting unit shown in FIG. 19 is "(a) ink ejection", the process proceeds to step S451, and if the content is "(b) head cleaning+ink ejection", a date and time at which ink ejection is started next is set, and the process proceed to step S442.

In step S442, "steps S231 to S233 and steps S241 to S243" described with reference to FIG. 19 in the second embodiment are executed.

In step S451, the ejection of the ink particles 68B from the nozzle 21 is started. The charging electrode 23 applies charging electric charge for phase search to the ink particles 68B, and the electric charge sensor 48 detects a signal thereof. In addition, the deflection electrode 24 applies a deflection voltage (1 to 7 kV).

In step S452, as described with reference to FIGS. 18A to 18C, the electric charge sensor 48 detects phase detection data, and a case where the phase detection data is higher than the threshold level SH and a case where the phase detection data is not higher than the threshold level SH are binarized and determined as "1" and "0", respectively.

In step S461, the number of times that binarized data in step S452 is determined to be "1" in one cycle (eight phases) is counted, and it is checked whether or not the number of phases in which binarized data is determined to be "1" is 1 or more. If the number of phases in which binarized data is determined to be "1" is 1 or more, the determination is "YES" (the ink particles 68B can be captured by the gutter 25), and the process proceeds to step S481. If the number of phases in which binarized data is determined to be "1" is 0, the determination is "NO" (the ink particles 68B cannot be captured by the gutter 25), and the process proceeds to step S462.

In step S462, since an abnormality is detected, the ejection of the ink from the nozzle 21 is stopped.

In step S463, the number of times (for example, two times) entered in "(e) number-of-times setting" of the (3) number-of-retrials column at time of occurrence of abnormality of the ink ejection start setting screen for ink ejection inside the head mounting unit shown in FIG. 19 is checked. If the number of ink ejection stops in S462 is equal to or less than the number of times (for example, two times) entered in "(e) number-of-times setting", step S442 is executed again. In addition, if the number of ink ejection stops in S462 is equal to or more than the number of times (for example, two times) entered in "(e) number-of-times setting", the process proceeds to step S471.

In step S471, after the head cleaning process is executed, the operation display unit 8 of the main body 1 or the display portion 20 of the head mounting unit 3 displays an abnormality confirmation message to notify that the operation start (ink ejection start) process has failed.

In step S472, the inkjet recording device 600 stands by in a state where the ejection of the ink from the nozzle 21 of the print head 2 is stopped, and an ink circulation system component such as the pump (for supply) 34 or the electromagnetic valve (for supply) 49 has no supply of power and is not operated.

In step S481, the number of times that binarized data in step S452 is determined to be "1" in one cycle (eight phases) is counted, and it is checked whether or not the number of phases in which binarized data is determined to be "1" is 7 or less. If the number of phases in which binarized data is determined to be "1" is 7 or less, the determination is "YES" (the amount of stains on the print head 2 is small), and the process proceeds to step S482. If the number of phases in which binarized data is determined to be "1" is 8 or more, the determination is "NO" (the amount of stains on the print head 2 is large), and the process proceeds to step S462.

In step S482, the ink is ejected from the nozzle 21 of the print head 2, the ink particles 68B are captured by the gutter 25, normal charging phase search is performed, and the operation start (ink ejection start) process is completed.

<Effects of Fourth Embodiment>

As described above, according to the fourth embodiment of the present invention, it is possible to provide the inkjet recording device 600 that prevents equipment around the print head 2 from being stained by performing the operation start (ink ejection start) process in a state where the print head 2 is set in the head mounting unit 3, even if beam bending (the ink particles 68B ejected from the nozzle 21 do not enter the gutter 25, and the print head 2 is stained with the ink) has occurred.

In addition, according to the fourth embodiment of the present invention, it is possible to provide the inkjet recording device 600 capable of automatically executing a restoration process such as head cleaning by performing the operation start (ink ejection start) process in a state where the print head 2 is set in the head mounting unit 3, even if beam bending has occurred.

Fifth Embodiment

Next, the inkjet recording device 600 according to a fifth embodiment of the present invention will be described. The fifth embodiment also adopts the same configurations as those of FIGS. 1 to 11 described in the first embodiment. Therefore, a description of FIGS. 1 to 11 will be omitted. In addition, a description of portions common to the first to fourth embodiments described above will be omitted. The fifth embodiment will be mainly described with reference to FIGS. 21 to 25.

<Operation and Liquid Flow>

Figure 21:
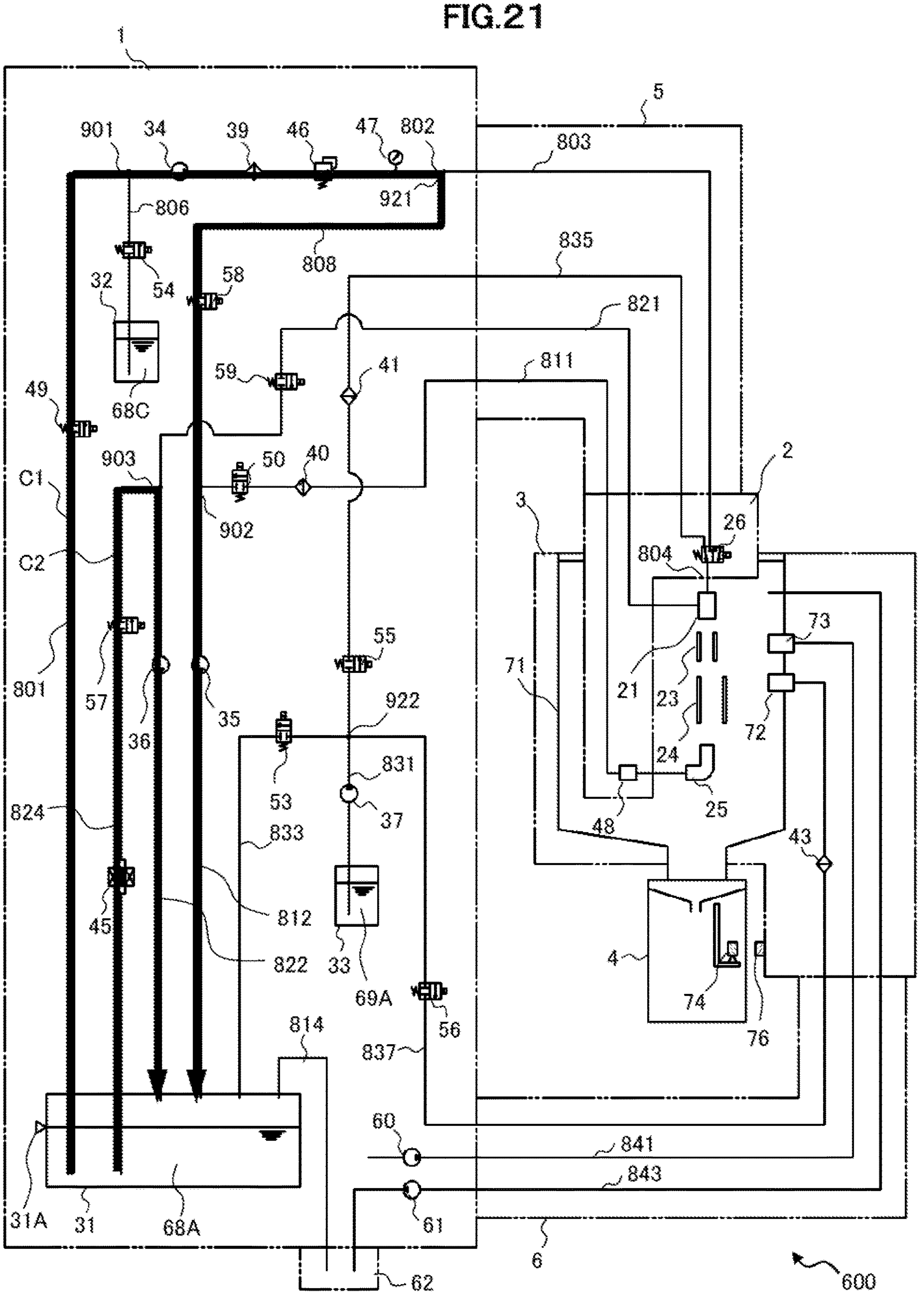
FIG. 21 is a fluid path diagram showing liquid flows in thick lines when ink circulation is performed inside the main body according to a fifth embodiment.
Figure 22:
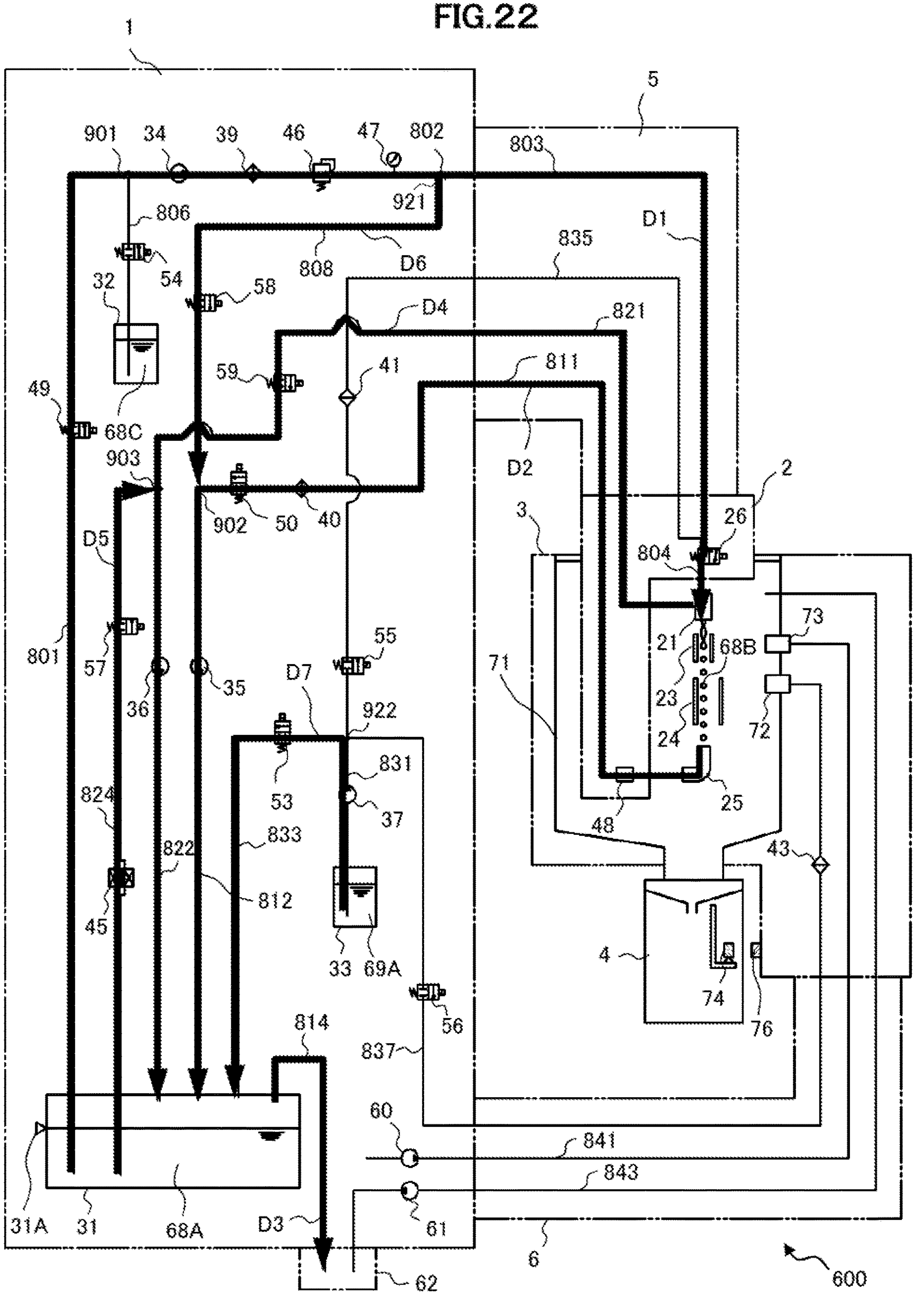
FIG. 22 is a fluid path diagram showing liquid flows and gas flows in thick lines when ink circulation is performed inside the main body and inside the print head according to the fifth embodiment.
Figure 23:
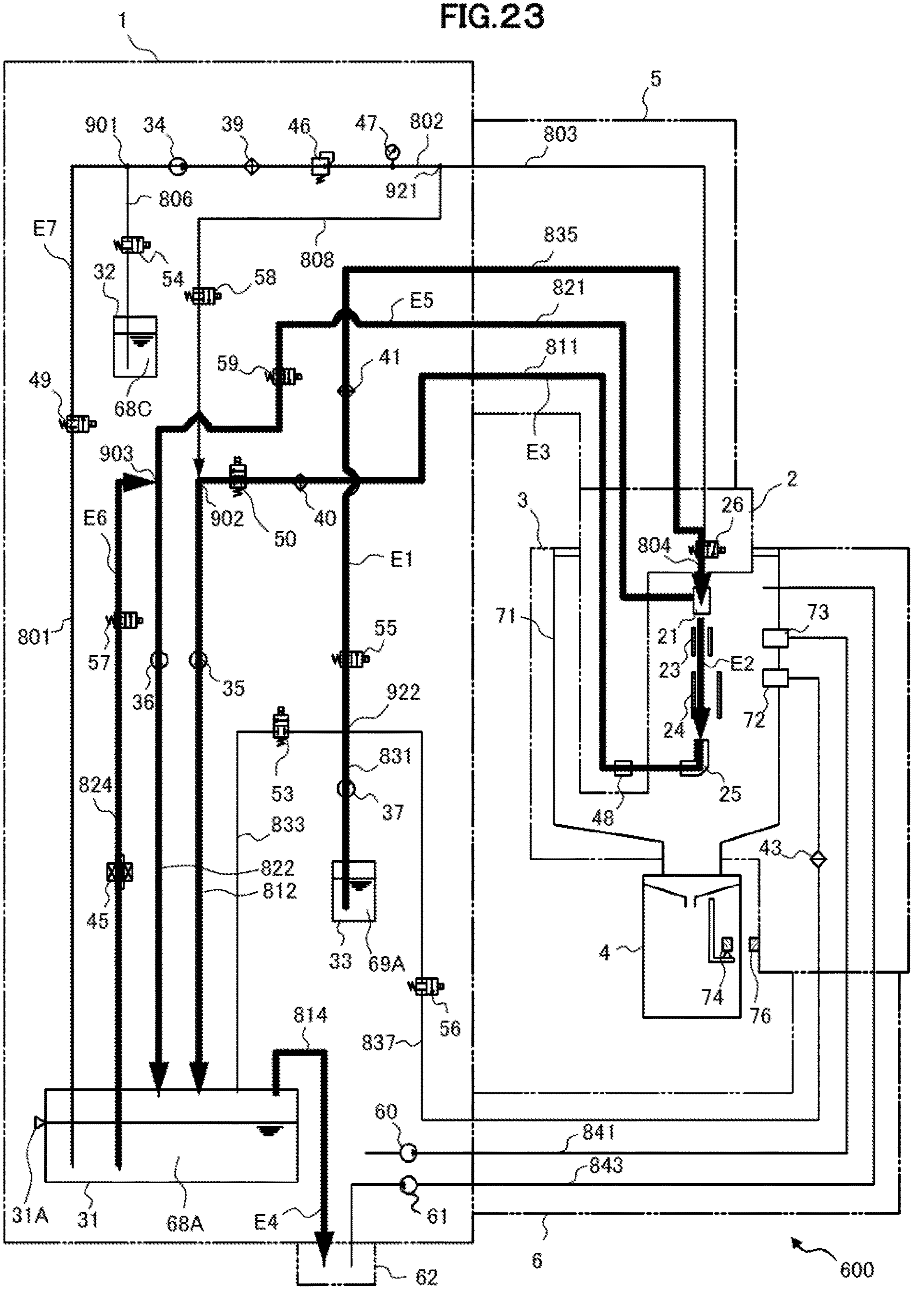
FIG. 23 is a diagram showing flows of ink in thick lines when nozzle cleaning and circulation path cleaning are performed according to the fifth embodiment.

First, an operation when ink circulation is executed inside the main body 1 and inside the print head 2 in a state where the print head 2 is set in the head mounting unit 3 will be described with reference to FIGS. 21 to 23. FIG. 21 is a fluid path diagram showing liquid flows in thick lines when ink circulation is performed inside the main body according to the fifth embodiment. FIG. 22 is a fluid path diagram showing liquid flows and gas flows in thick lines when ink circulation is performed inside the main body and inside the print head according to the fifth embodiment. FIG. 23 is a diagram showing flows of the ink when nozzle cleaning and circulation path cleaning are performed according to the fifth embodiment. FIG. 21 is a fluid path diagram showing liquid flows in thick lines (C1 and C2) when the inkjet recording device 600 according to the fifth embodiment is in a state where the print head 2 is set in the head mounting unit 3, and ink circulation is performed inside the main body 1.

In the main body 1, the electromagnetic valve (for supply) 49 and the electromagnetic valve (for main body circulation) 58 are energized to open the flow path, and the pump (for supply) 34 and the pump (for collection) 35 are operated, so that as indicated by a thick line of arrow C1, the ink 68A circulates in such a way that the ink 68A contained in the ink container 31 of the main body 1 passes through the electromagnetic valve (for supply) 49, the pump (for supply) 34, the filter (for supply) 39, the pressure regulating valve 46, the pressure sensor 47, the electromagnetic valve (for main body circulation) 58, and the pump (for collection) 35 to return to the ink container 31.

In addition, in the main body 1, the electromagnetic valve (for viscosity measurement) 57 is energized to open the flow path, and the pump (for circulation) 36 is operated, so that as indicated by a thick line of arrow C2, the ink 68A circulates in such a way that the ink 68A contained in the ink container 31 of the main body 1 passes through the viscometer 45, the electromagnetic valve (for viscosity measurement) 57, and the pump (for circulation) 36 to return to the ink container 31. In addition, when a viscosity of the ink 68A is measured using the viscometer 45 at the timing when the ink circulates inside the main body 1, a state of the ink 68A when used next is easily identified.

Next, FIG. 22 is a fluid path diagram showing liquid flows in thick lines (D1 to D7) when the inkjet recording device 600 according to the present embodiment is in a state where the print head 2 is set in the head mounting unit 3, and ink circulation is performed inside the main body and inside the head mounting unit 3.

In the ink supply paths (paths 801 to 804), the electromagnetic valve (for supply) 49 is energized to open the flow path, the switching valve 26 is energized to connect the ink supply paths to the nozzle 21, and the pump (for supply) 34 is operated, so that as indicated by a thick line of arrow D1, the ink 68A contained in the ink container 31 of the main body 1 is supplied to the nozzle 21 of the print head 2, and is discharged from the nozzle 21 as the ink particles 68B. A voltage is applied to the ink particles 68B by the charging electrode 23, and the electric charge sensor 48 checks a charging amount of the ink particles 68B.

In the ink collection paths 811 and 812, the electromagnetic valve (for collection) 50 is energized to open the flow path, and the pump (for collection) 35 is operated, so that as indicated by a thick line of arrow D2, the ink particles 68B and air around the print head 2 are suctioned from the gutter 25 and are suctioned and pressure-fed to the ink container 31 of the main body 1. In the ink collection paths 811 and 812, since the ink 68A and the air flow in a state of gas-liquid mixture, a solvent component of the ink 68A dissolves in the air, and the air becomes solvent gas, and flows into the ink container 31. The ink that has flowed into the ink container 31 is contained in a bottom portion, and as indicated by a thick line of arrow D3, the air that has become solvent gas is discharged to the outside of the main body 1 as solvent gas.

In the inkjet recording device 600, since the solvent component in the ink 68A is discharged to the outside of the device as solvent gas in this way, when the operating time is increased, the ratio of the solvent component in the ink 68A decreases, and the concentration of the ink 68A becomes high. In addition, conversely, when the operating time is short, the concentration of the ink is lowered by the solvent 69A that has flowed into the ink container 31 in the nozzle cleaning process or the like. For this reason, in the paths (for viscosity measurement) 824 and 822, the electromagnetic valve (for viscosity measurement) 57 is energized to open the flow path, and the pump (for circulation) 36 is operated, so that as indicated by a thick line of arrow D5, the ink 68A in the ink container 31 is fed to the viscometer 45, and a viscosity (to be converted into a concentration) of the ink 68A is measured on a regular basis. A detection value of the measured viscosity is input to the control unit 7. As a result, the control unit 7 performs control to replenish the ink 68C in the auxiliary ink container 32 to the ink container 31 when the concentration of the ink 68A is low, and to replenish the solvent 69A in the solvent container 33 to the ink container 31 as indicated by a thick line of arrow D7 when the concentration of the ink 68A is high. In this way, in the inkjet recording device 600, control is performed such that the viscosity of the ink 68A is within a range of management values.

In addition, in the ink circulation paths 821 and 822, in a state where the ink 68A is supplied to the nozzle 21 from the ink container 31 as indicated by a thick line of arrow D1, the electromagnetic valve (for circulation) 59 is energized to open the flow path, and the pump (for circulation) 36 is operated, so that the ink 68A circulates in such a way that at least some of the ink 68A supplied to the nozzle 21 is suctioned by the pump (for circulation) 36 and returns to the ink container 31 in a flow indicated by a thick line of arrow D3. In addition, before the switching valve 26 is energized, the electromagnetic valve (for main body circulation) 58 is energized to open the flow path, and the pump (for circulation) 36 is operated, so that as indicated by a thick line of arrow D6, the ink 68A can also be circulated through the path (for main body circulation) 808.

Next, FIG. 23 is a diagram showing flows of the ink in thick lines (E1 to E7) when the inkjet recording device 600 according to the fifth embodiment is in a state where the print head 2 is set in the head mounting unit 3, and nozzle cleaning and circulation path cleaning are performed.

In the nozzle cleaning paths (paths 831 and 835), the electromagnetic valve (for nozzle cleaning) 55 is energized to open the flow path, and the pump (for the solvent) 37 is operated, so that as indicated by a thick line of arrow E1, the solvent 69A contained in the solvent container 33 of the main body 1 is supplied to the print head 2, and is discharged from the nozzle 21. In addition, in the ink collection paths 811 and 812, the electromagnetic valve (for collection) 50 is energized to open the flow path, and the pump (for collection) 35 is operated, so that as indicated by a thick line of arrow E1, the solvent 69A discharged from the nozzle 21 is captured by the gutter 25, and is collected in the ink container 31.

In the ink circulation paths 821 and 822, in a state where the solvent 69A is supplied to the nozzle 21 from the solvent container 33 as indicated by a thick line of arrow E1, the electromagnetic valve (for circulation) 59 is energized to open the flow path, and the pump (for circulation) 36 is operated, so that at least some of the solvent 69A supplied to the nozzle 21 is suctioned by the pump (for circulation) 36, and is collected in the ink container 31 in a flow indicated by a thick line of arrow E3. In this way, the inkjet recording device 600 can clean the nozzle 21, the ink paths (for collection) 811 and 812, and the paths (for ink circulation) 821 and 822 with the solvent 69A.

In addition, after the cleaning of the paths (the nozzle 21, the ink collection paths 811 and 812, and the ink circulation paths 821 and 822) is completed, in the main body 1, the electromagnetic valve (for supply) 49 and the electromagnetic valve (for main body circulation) 58 are energized to open the flow paths, and the pump (for supply) 34 and the pump (for collection) 35, so that the ink 68A contained in the ink container 31 of the main body 1 circulates as indicated by a thick line of arrow E7.

Furthermore, in the main body 1, the electromagnetic valve (for viscosity measurement) 57 is energized to open the flow path, and the pump (for circulation) 36 is operated, so that as indicated by a thick line of arrow E6, the ink 68A contained in the ink container 31 of the main body 1 is supplied to the viscometer 45, a viscosity of the ink 68A is measured using the viscometer 45 at the timing when the ink circulates inside the main body 1, and a state of the ink 68A when used next is identified.

<Screen Configuration of Fifth Embodiment>

Figure 24:
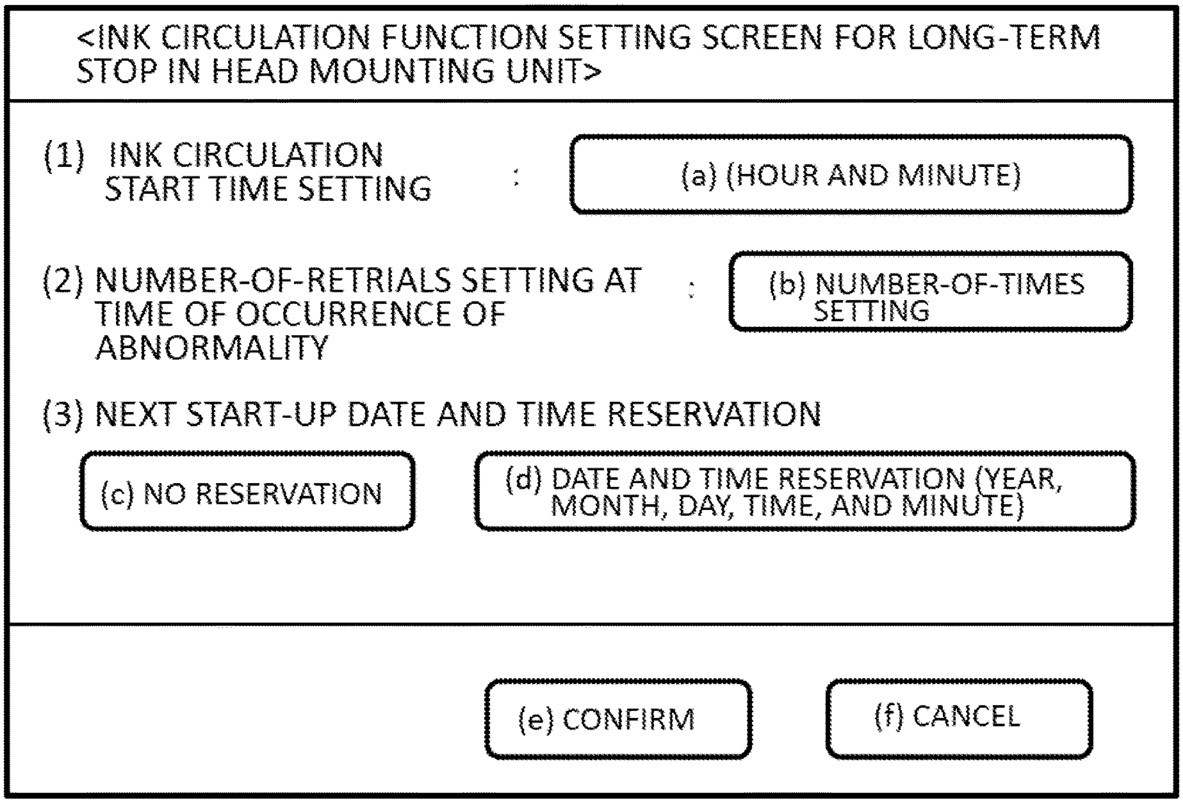
FIG. 24 shows a long-term operation stop setting screen according to the fifth embodiment.

An ink circulation function setting screen for long-term stop in the head mounting unit of the inkjet recording device 600 according to the fifth embodiment will be described with reference to FIG. 24. Incidentally, the screen of FIG. 24 is displayed on the operation display unit 8.

First, "(a) hour and minute" is entered in a "(1) ink circulation start time setting column" of the ink circulation function setting screen for long-term stop in the ink inside the head mounting unit.

Next, the number of times can be set in a range of 0 to 5 times for "(b) number-of-times setting" in a "(2) number-of-retrials setting column at time of occurrence of abnormality" of the ink circulation function setting screen for long-term stop in the head mounting unit.

Next, one of "(c) no reservation and (d) date and time reservation"is selected in an" (3) next start-up date and time reservation column" of the ink circulation function setting screen for long-term stop in the head mounting unit. When "(c) no reservation" is set, an ink circulation function for long-term stop in the head mounting unit is executed, but a start-up (ink ejection start) process is not executed at the determined time. When "(d) date and time reservation" is selected, "year, month, day, hour, and minute" at which ink ejection inside the head mounting unit wants to be started can be set.

In addition, after the settings of (1) to (3) of the ink circulation function setting screen for long-term stop in the head mounting unit are briefly completed, one of "(e) determination and (f) cancel" buttons is pressed. When the "(e) determination" button is pressed, the displayed settings of (1) to (3) are overwritten in the control unit 7, and the ink circulation function for long-term stop in the head mounting unit is started. In addition, when the "(f) cancel" button is pressed, the displayed settings of (1) to (3) are not overwritten in the control unit 7, and the ink circulation function for long-term stop in the head mounting unit is not started.

<Description of Ink Circulation Start Flow for Long-Term Stop According to Fifth Embodiment>

Figure 25:
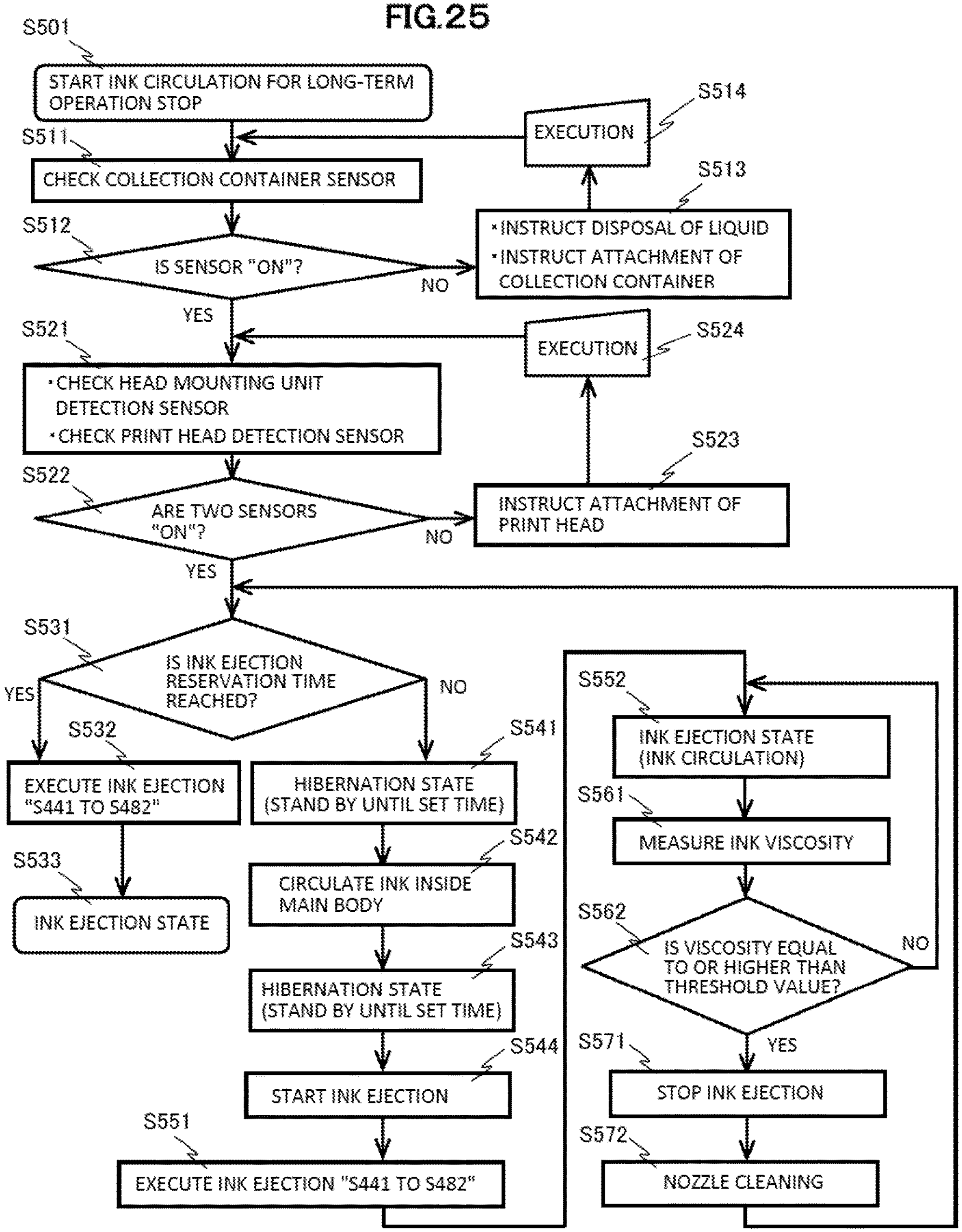
FIG. 25 is a flowchart of ink circulation for long-term operation stop according to the fifth embodiment.

Next, an operation flow of an ink circulation start process for long-term operation stop of the inkjet recording device 600 according to the present embodiment will be described with reference to FIG. 25. FIG. 25 is a flowchart of ink circulation for long-term operation stop according to the fifth embodiment.

In FIG. 25, first, in step S501, a start button for performing the ink circulation start process for long-term operation stop displayed on the operation display unit 8 that is a touch panel type is pressed. As a condition to enable the start button for performing the ink circulation start process for long-term operation stop, the inkjet recording device 600 is in a state where the ejection of the ink from the nozzle 21 of the print head 2 is stopped and an ink circulation system component such as the pump (for supply) 34 or the electromagnetic valve (for supply) 49 has no supply of power and is not operated.

In FIG. 25, "steps S511 to S514 and steps S521 to S524" are the same as "step S111 to S114 and steps S121 to S124" described with respect to FIG. 13 in the first embodiment. For this reason, a description of "steps S511 to S514 and steps S521 to S524" will be omitted.

In step S531, it is checked that a content of "(d) date and time reservation" is set in the "(3) next start-up date and time reservation column" of the ink circulation function setting screen for long-term stop in the head mounting unit shown in FIG. 24. In addition, if the set reservation time is reached, the determination is "YES", and the process proceeds to step S532. If the set reservation time is not reached, the determination is "NO", and the process proceeds to step S541. Incidentally, even when the content set in the (3) next start-up date and time reservation column shown in FIG. 24 is "(c) no reservation", the determination is "NO", and the process proceeds to step S541.

In step S541, a setting content of "(a) hour and minute" in the "(1) ink circulation start time setting column" of the ink circulation function setting screen for long-term stop in the head mounting unit shown in FIG. 24. The inkjet recording device 600 is in a hibernation state (state where the ejection of the ink from the nozzle 21 of the print head 2 is stopped and an ink circulation system component such as the pump (for supply) 34 or the electromagnetic valve (for supply) 49 has no supply of power and is not operated), and stands by until the set time set is reached.

In step S542, ink circulation inside the main body 1 described with reference to FIG. 21 is executed.

In step S543, the same process as that of step S541 is executed.

In step S544, since the time checked in step S541 is reached, the ink ejection process is started.

In step S551, "steps S441 and S442, steps S451 and S452, steps S461 to S463, steps S71 and S472, and steps S481 and S482" described with reference to FIG. 20 in the fourth embodiment are executed.

In step S552, ink circulation inside the main body 1 and inside the print head 2 described with reference to FIG. 22 is executed.

In step S561, a viscosity of the ink 68A is measured using the viscometer 45. An ink concentration is calculated based on a relationship between temperature and viscosity for each type of ink recorded in the control unit 7.

In step S562, it is determined whether or not the ink concentration calculated in step S561 is higher than a threshold value determined in advance. When the concentration is higher than the threshold value, the determination is "YES", and the process proceeds to step S571. When the concentration is lower than the threshold value, the determination is "NO", and the step S552 is executed again. In the inkjet recording device 600, the ink concentration of the ink 68A can be increased by performing ink circulation described with reference to FIG. 22.

In step S571, the ejection of the ink from the nozzle 21 is stopped by de-energizing the switching valve 26.

In step S572, nozzle cleaning and circulation path cleaning described with reference to FIG. 23 are executed, and step S531 is executed again.

In step S532, "steps S441 and S442, steps S451 and S452, steps S461 to S463, steps S71 and S472, and steps S481 and S482" described with reference to FIG. 20 in the fourth embodiment are executed.

In step S533, the ink is ejected from the nozzle 21 of the print head 2, the ink particles 68B are captured by the gutter 25, normal charging phase search is performed, and the operation start (ink ejection start) process is completed.

<Effects of Fifth Embodiment>

As described above, according to the fifth embodiment of the present invention, it is possible to provide the inkjet recording device 600 capable of automatically executing ink circulation inside the main body 1 and inside the print head 2 when a certain period of time has elapsed, so as to prevent ink circulation system components from being stuck when the inkjet recording device 600 is not used for a long period of time in a state where the print head 2 is set (mounted) in the head mounting unit 3, and restarting ink circulation to the main body 1 and to the print head 2 when the certain period of time has elapsed again, if a trouble such as beam bending has occurred.

In addition, according to the fifth embodiment of the present invention, it is possible to provide the inkjet recording device 600 capable of reducing a defect at the start of operation by automatically executing ink circulation inside the main body 1 and inside the print head 2 when a certain period of time has elapsed until the reserved and set operation start (ink ejection start) date and time.

Other Embodiments

The first to fifth embodiments have been described above, but the present invention is not limited to the above-described embodiments and includes various modification examples. In addition, the above embodiments have been described in detail for easy understanding of the present invention, and the present invention is not necessarily limited to including all the configurations described.

REFERENCE SIGNS LIST

1 Main body
2 Print head
3 Head mounting unit
4 Collection container
5 Cable (for print head)
6 Cable (for head mounting unit)
7 Control unit
8 Operation display unit
11 Belt conveyor
12A Print object
12B Print object
13 Print head fixing bracket
16 Head base
17 Protective cover
18 Start button
19 Stop button
20 Display portion
21 Nozzle
23 Charging electrode
24 Deflection electrode
24A Positive electrode
24B Ground electrode
25 Gutter
26 Switching valve
27 Temperature sensor A
28 Magnetic sensor C
28A Electric wire
31 Ink container
31A Liquid level sensor
32 Auxiliary ink container
33 Solvent container
34 Pump (for supply)
35 Pump (for collection)
36 Pump (for circulation)
37 Pump (for solvent)
39 Filter (for supply)
40 Filter (for collection)
41 Filter (for nozzle cleaning)
43 Filter (for head cleaning)
45 Viscometer
46 Pressure regulating valve
47 Pressure sensor
48 Electric charge sensor
49 Electromagnetic valve (for supply)
50 Electromagnetic valve (for collection)
53 Electromagnetic valve (for solvent replenishment)
54 Electromagnetic valve (for ink replenishment)
55 Electromagnetic valve (for nozzle cleaning)
56 Electromagnetic valve (for head cleaning)
57 Electromagnetic valve (for viscosity measurement)
58 Electromagnetic valve (for main body circulation)
59 Electromagnetic valve (for circulation)
60 Pump (for drying)
61 Pump (for suctioning)
62 Exhaust duct connection portion
68A Ink
68B Ink particles
68B1 Ink particles
68B2 Charging electric charge
68C Ink
69A Solvent
70 Liquid
71 Cleaning tank
71A Attachment portion
72 Cleaning nozzle
72A Liquid discharge hole A portion
72B Liquid discharge hole B portion
73 Air supply nozzle
73A Air discharge hole
74 Float
75 Magnet A
76 Magnetic sensor A
76A Electric wire
77 Container
77A Attachment portion
77B Liquid storage portion
77C Inner screw portion
78 Partition
78A Liquid inflow hole portion
78B Liquid outflow hole portion
79 Holder
80 Temperature sensor B
80A Electric wire
81 Cleaning block
81A Head mounting portion
81B Head insertion portion
81C Hole portion
81D Flow path A portion
81E Flow path B portion
81F Flow path C portion
82 Lid hinge
83 Lid member
84 Magnetic sensor B
84A Electric wire
85 Cover
86 Magnet B
87 Magnet C
88 Suction joint
88A Chamber
88B Joint A portion
88C Joint B portion
89 Liquid joint
90 Air joint
91 Fixing portion
92 Fixing jig (for conveyor)
93 Fitting portion
301 MPU
302 Bus line
306 ROM
307 RAM
311 Viscosity measurement circuit
312 Pressure detection circuit
313 Liquid level detection circuit
314 Pump control circuit
315 Electromagnetic valve drive circuit
321 Air pump control circuit
322 Collection container sensor detection circuit
323 Print head detection circuit
324 Head mounting unit detection circuit
331 Excitation voltage generation circuit
332 Deflection voltage generation circuit
341 Phase search charging signal generation circuit
342 Print charging signal generation circuit
343 D/A converter
344 Amplification circuit
351 Phase determination circuit

352 A/D converter
353 Amplification circuit
600 Inkjet recording device
801 to 804 Path (for supply)
806 Path (for replenishment)
808 Path (for main body circulation)
811, 812 Path (for collection)
814 Path (for exhaust)
821, 822 Path (for head circulation)
824 Path (for viscosity measurement)
831 Path (for solvent supply)
833 Path (for solvent replenishment)
835 Path (for nozzle cleaning)
837 Path (for head cleaning)
841 Path (for air supply)
843 Path (for air suction)
901 to 903 Merge path
921, 922 Branch path

The invention claimed is:

1. An inkjet recording device comprising:

a print head that performs printing;

a main body including a path for supplying ink in an ink container to the print head, a path for collecting the ink that is not used for printing, in the ink, a path for supplying a solvent in a solvent container to the ink container, and a regulating unit that regulates a flow of the ink and the solvent in each of the paths;

a control unit that controls the main body and the print head; and a head mounting unit including a cleaning tank having a space in which the print head is containable, and an opening portion at a lower portion of the cleaning tank, and a collection container that collects a liquid flowing out from the opening portion, wherein a solvent vapor suction path connected to the cleaning tank to suction and discharge solvent vapor generated in the cleaning tank and a drive unit that discharges the solvent vapor are provided, and wherein the head mounting unit is provided with a detector that detects that the collection container is attached to the opening portion of the cleaning tank.

2. The inkjet recording device according to claim 1, wherein the head mounting unit is provided with a print head detector that detects that the print head is set in the cleaning tank.

3. The inkjet recording device according to claim 1, wherein the solvent vapor suction path includes a chamber that contains a liquid contained in the solvent vapor.

4. The inkjet recording device according to claim 1, wherein the head mounting unit is connected to the main body by a cable.

5. The inkjet recording device according to claim 1, wherein the head mounting unit includes a cleaning nozzle that discharges the solvent toward the print head contained in the cleaning tank.

6. The inkjet recording device according to claim 5, wherein the cleaning nozzle includes a nozzle hole that discharges the solvent so as to aim at a nozzle of the print head, and a nozzle hole that discharges the solvent so as to aim at a deflection electrode of the print head.

7. The inkjet recording device according to claim 1, wherein an air discharge port that discharges air for drying the print head into the cleaning tank is formed in the head mounting unit.

8. The inkjet recording device according to claim 1, wherein the solvent vapor suction path is connected to a main body side.

9. An inkjet recording device comprising:

a print head that performs printing;

a main body including a path for supplying ink in an ink container to the print head, a path for collecting the ink that is not used for printing, in the ink, a path for supplying a solvent in a solvent container to the ink container, and a regulating unit that regulates a flow of the ink and the solvent in each of the paths;

a control unit that controls the main body and the print head; and a head mounting unit including a cleaning tank having a space in which the print head is containable, and an opening portion at a lower portion of the cleaning tank, and a collection container that collects a liquid flowing out from the opening portion, wherein a solvent vapor suction path connected to the cleaning tank to suction and discharge solvent vapor generated in the cleaning tank and a drive unit that discharges the solvent vapor are provided, wherein the solvent vapor suction path is connected to a main body side, and wherein the main body includes a solvent vapor exhaust path connected to the ink container, and a solvent vapor outlet portion of the solvent vapor suction path discharges the solvent vapor into the same space as an outlet portion of the solvent vapor exhaust path.

10. An inkjet recording device comprising:

a print head that performs printing;

a main body including a path for supplying ink in an ink container to the print head, a path for collecting the ink that is not used for printing, in the ink, a path for supplying a solvent in a solvent container to the ink container, and a regulating unit that regulates a flow of the ink and the solvent in each of the paths;

a control unit that controls the main body and the print head; and a head mounting unit including a cleaning tank having a space in which the print head is containable, and an opening portion at a lower portion of the cleaning tank, and a collection container that collects a liquid flowing out from the opening portion, wherein a solvent vapor suction path connected to the cleaning tank to suction and discharge solvent vapor generated in the cleaning tank and a drive unit that discharges the solvent vapor are provided, wherein the head mounting unit includes a cleaning nozzle that discharges the solvent toward the print head contained in the cleaning tank, wherein an air discharge port that discharges air for drying the print head into the cleaning tank is formed in the head mounting unit, and wherein the solvent vapor suction path is configured to suction the solvent vapor in a head cleaning process using the cleaning nozzle and a head drying process using the air discharge port.

* * * * *